(12) United States Patent
Chaumette et al.

(10) Patent No.: US 12,741,498 B2
(45) Date of Patent: Sep. 22, 2026

(54) INDEPENDENT CORNER LIFT SYSTEM FOR VEHICLES

(71) Applicant: BeijingWest Industries Co., Ltd., Beijing (CN)

(72) Inventors: Pascal Chaumette, Creteil (FR); Julien Guiet, Saint Prix (FR); Paul Gendry, Moussy-le-Neuf (FR); Jerzy Piotr Szymanski, Villeneuve les Sablons (FR)

(73) Assignee: BeijingWest Industries Co., Ltd., Beijing (CN)

( * ) Notice: Subject to any disclaimer, the term of this patent is extended or adjusted under 35 U.S.C. 154(b) by 75 days.

(21) Appl. No.: 18/515,095

(22) Filed: Nov. 20, 2023

(65) Prior Publication Data

US 2024/0166007 A1 May 23, 2024

Related U.S. Application Data

(60) Provisional application No. 63/427,091, filed on Nov. 21, 2022.

(30) Foreign Application Priority Data

Nov. 3, 2023 (CN) ......................... 202311459586.3

(51) Int. Cl.
*B60G 17/015* (2006.01)
*B60G 17/056* (2006.01)

(52) U.S. Cl.
CPC ....... *B60G 17/0152* (2013.01); *B60G 17/056* (2013.01); *B60G 2202/12* (2013.01);
(Continued)

(58) Field of Classification Search
CPC .............. B60G 17/0152; B60G 17/056; B60G 2202/12; B60G 2202/154;
(Continued)

(56) References Cited

U.S. PATENT DOCUMENTS 3,015,345 A * 1/1962 Michael ................ F16L 55/052 138/31
4,295,538 A * 10/1981 Lewus .................. B60G 13/14 180/165

(Continued)

FOREIGN PATENT DOCUMENTS

CN 114212732 A 3/2022
DE 102015013609 A1 4/2016

(Continued)

OTHER PUBLICATIONS

Extended European Search Report issued on Jul. 11, 2024 for counterpart European patent application No. 23210861.3.

(Continued)

*Primary Examiner* — Carl C Staubach
(74) *Attorney, Agent, or Firm* — Dickinson Wright PLLC

(57) ABSTRACT

A height adjustment system for a vehicle includes: a reservoir configured to hold hydraulic fluid; at least one lift actuator operably disposed between a wheel and a chassis element of the vehicle for adjusting the height of the vehicle; a supply pump having an inlet port in fluid communication with the reservoir and configured to transfer the hydraulic fluid to the at least one lift actuator via a manifold; a supply check valve configured to allow fluid flow from an outlet of the supply pump to the manifold while blocking fluid flow in an opposite direction; and at least one of: a supply pump isolation valve configured to selectively bypass hydraulic fluid around the supply check valve, or a secondary actuator isolation valve configured to selectively control fluid flow between the at least one lift actuator and the inlet port of the supply pump.

8 Claims, 34 Drawing Sheets

(52) U.S. Cl.
CPC .. *B60G 2202/413* (2013.01); *B60G 2202/416* (2013.01); *B60G 2204/8304* (2013.01); *B60G 2500/02* (2013.01); *B60G 2500/30* (2013.01)

(58) Field of Classification Search
CPC ........ B60G 2202/413; B60G 2202/416; B60G 2204/8304; B60G 2500/02; B60G 2500/203; B60G 2500/30; B60G 2800/912
See application file for complete search history.

(56) References Cited

U.S. PATENT DOCUMENTS 5,855,379 A * 1/1999 Buma .................. B60T 8/4827 701/91
6,588,859 B2 * 7/2003 Loudon ................ B60T 8/1755 303/146
6,902,045 B2 * 6/2005 Oliver ................. B60G 17/021 267/64.11
8,326,488 B2 * 12/2012 Onuma ................ B60G 17/015 701/38
11,584,187 B2 2/2023 Newstead et al.
12,330,461 B2 * 6/2025 Szymanski ........ B60G 17/0272
2002/0166532 A1 * 11/2002 Mori ..................... F02N 15/046 123/179.31
2004/0040298 A1 * 3/2004 Kobayashi .............. B60T 8/405 60/533
2004/0195745 A1 * 10/2004 Oliver .................. B60G 17/021 267/221
2014/0236447 A1 * 8/2014 Sekiya ................ B60T 8/17636 701/78
2014/0265170 A1 * 9/2014 Giovanardi ........... F16K 11/065 280/5.5
2016/0114645 A1 * 4/2016 Kim ..................... B60G 17/033 280/5.514
2019/0100183 A1 * 4/2019 Jung ....................... B60T 7/042
2019/0308484 A1 * 10/2019 Belter .................. B60G 17/027
2020/0223274 A1 7/2020 Tucker et al.
2021/0008942 A1 * 1/2021 Kemnitz .................. H02K 7/06
2021/0061633 A1 * 3/2021 Weiss .................... F15B 19/002
2022/0258815 A1 * 8/2022 Argenziano ......... B60G 17/056

FOREIGN PATENT DOCUMENTS

DE 102017107994 A1 10/2018
DE 102022103198 A1 8/2022

OTHER PUBLICATIONS

The Partial European Search Report issued on Apr. 19, 2024 for counterpart European patent application No. 23210861.3.
The First Office Action issued on Sep. 1, 2025 for counterpart European patent application No. 23210861.3 (6 pages).
The Second Office Action issued on Jan. 19, 2026 for counterpart European patent application No. 23210861.3.

* cited by examiner

BODY TO WHEEL MEASUREMENT $H_R = H_L$

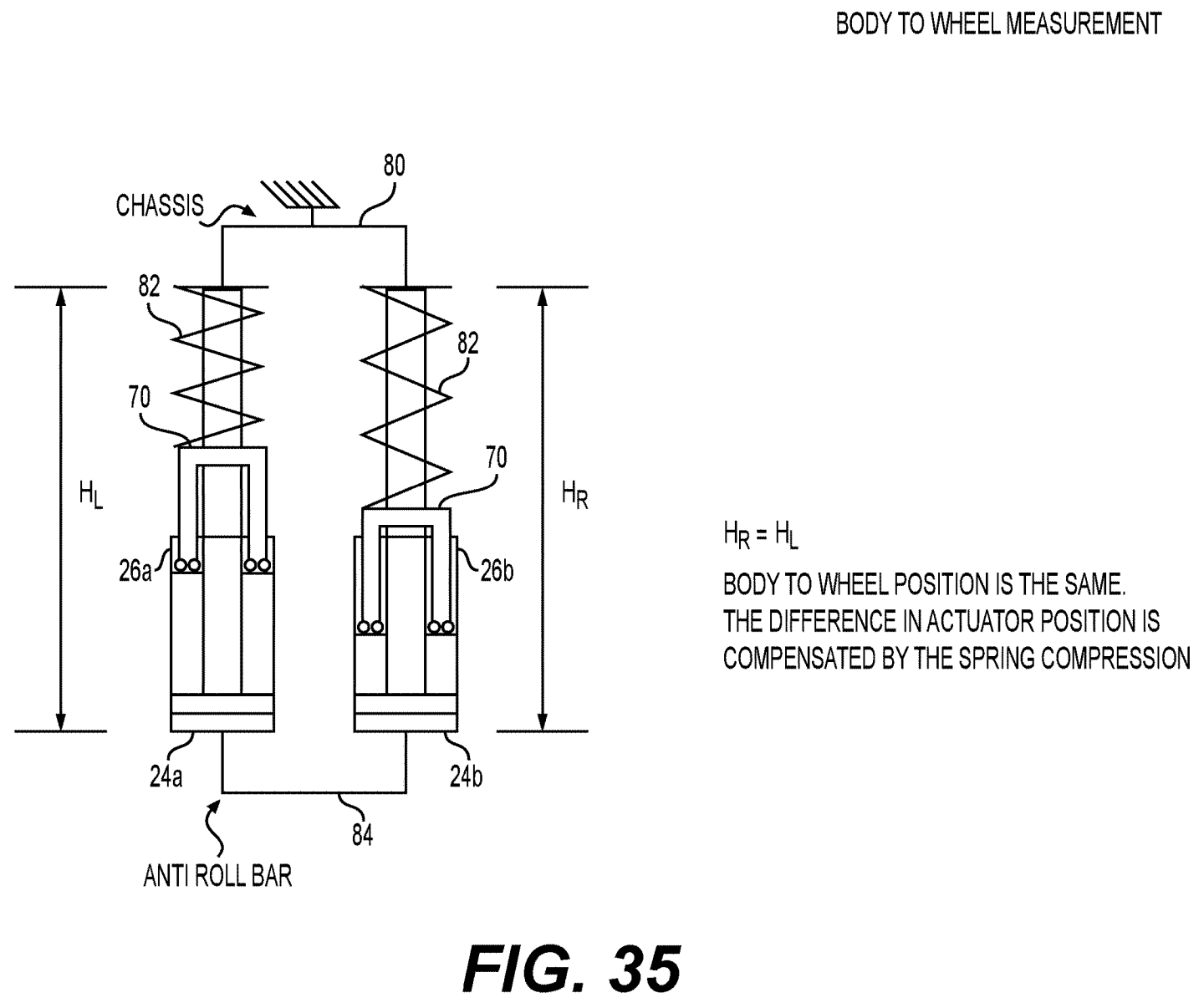

BODY TO WHEEL POSITION IS THE SAME.
THE DIFFERENCE IN ACTUATOR POSITION IS
COMPENSATED BY THE SPRING COMPRESSION $H_R$ 70
26b
82
24b
80
84
CHASSIS
ANTI ROLL BAR
82
70
26a
24a $H_L$

*FIG. 35*

INDEPENDENT CORNER LIFT SYSTEM FOR VEHICLES

CROSS REFERENCE TO RELATED APPLICATIONS

This U.S. utility patent application claims the benefit of U.S. Provisional Patent Application No. 63/427,091, filed Nov. 21, 2022, and China Non-Provisional Patent Application No. CN202311459586.3, filed Nov. 3, 2023, the contents of each are incorporated herein by reference in their entirety.

BACKGROUND OF THE INVENTION

1. Field of the Invention

The present disclosure relates generally to systems for adjusting the height of a vehicle. More specifically, the present disclosure pertains to an electro-hydraulic system for independently adjusting heights of different corners of a vehicle.

2. Related Art

Systems capable of changing vehicle height can enable additional functionalities and play important role to improve vehicles energy efficiency. However, development of electro-hydraulic solutions for adjusting vehicle ride height encounter number of technical and cost challenges.

U.S. Pat. No. 6,902,045 describes one such example of a system for adjusting vehicle height. The system and apparatus of U.S. Pat. No. 6,902,045 may be used to adjust the height of a front end of a vehicle having a coil-over shock suspension.

SUMMARY OF THE INVENTION

The present disclosure provides a height adjustment system for a vehicle. The height adjustment system includes: a reservoir configured to hold hydraulic fluid; at least one lift actuator operably disposed between a wheel and a chassis element of the vehicle for adjusting the height of the vehicle; a supply pump having an inlet port in fluid communication with the reservoir and configured to transfer the hydraulic fluid to the at least one lift actuator via a manifold; a supply check valve configured to allow fluid flow from an outlet of the supply pump to the manifold while blocking fluid flow in an opposite direction; and at least one of: a supply pump isolation valve configured to selectively bypass hydraulic fluid around the supply check valve, or a secondary actuator isolation valve configured to selectively control fluid flow between the at least one lift actuator and the inlet port of the supply pump.

The present disclosure provides a height adjustment system for a vehicle. The height adjustment system includes: a reservoir configured to hold hydraulic fluid; at least one lift actuator operably disposed between a wheel and a chassis element of the vehicle for adjusting the height of the vehicle; a piston pump assembly including a pump piston movable through a cylinder to supply hydraulic fluid to each of a first manifold and a second manifold; an actuator isolation valve configured to selectively control fluid flow between the first manifold and the at least one lift actuator; and a second actuator isolation valve configured to selectively control fluid flow between the second manifold and the at least one lift actuator.

The present disclosure provides a hydraulic control unit for a height adjustment system of a vehicle. The hydraulic control unit includes: a supply passage configured to attach to a reservoir for transmitting a hydraulic fluid; a manifold; a supply pump having an inlet port in fluid communication with the reservoir via the supply passage and configured to transfer the hydraulic fluid to at least one lift actuator via the manifold; a supply check valve configured to allow fluid flow from an outlet of the supply pump to the manifold while blocking fluid flow in an opposite direction; and at least one of: a supply pump isolation valve configured to selectively bypass hydraulic fluid around the supply check valve, or a secondary actuator isolation valve configured to selectively control fluid flow between the at least one lift actuator and the inlet port of the supply pump.

BRIEF DESCRIPTION OF THE DRAWINGS

Further details, features and advantages of designs of the invention result from the following description of embodiment examples in reference to the associated drawings.

FIG. 35 shows a schematic diagram showing body to wheel measurement in an ICL system, in accordance with an aspect of the present disclosure.

DESCRIPTION OF THE ENABLING EMBODIMENTS

Figure 2:
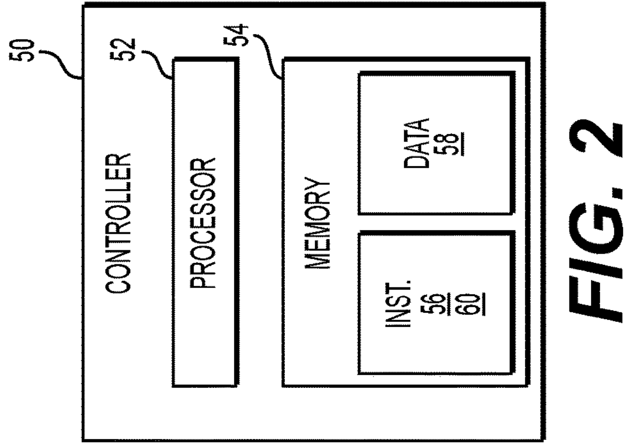
FIG. 2 shows a schematic block diagram of a controller for a lift electronic control unit of the ICL system of the present disclosure.

Referring to the drawings, the present invention will be described in detail in view of following embodiments.

Figure 1:
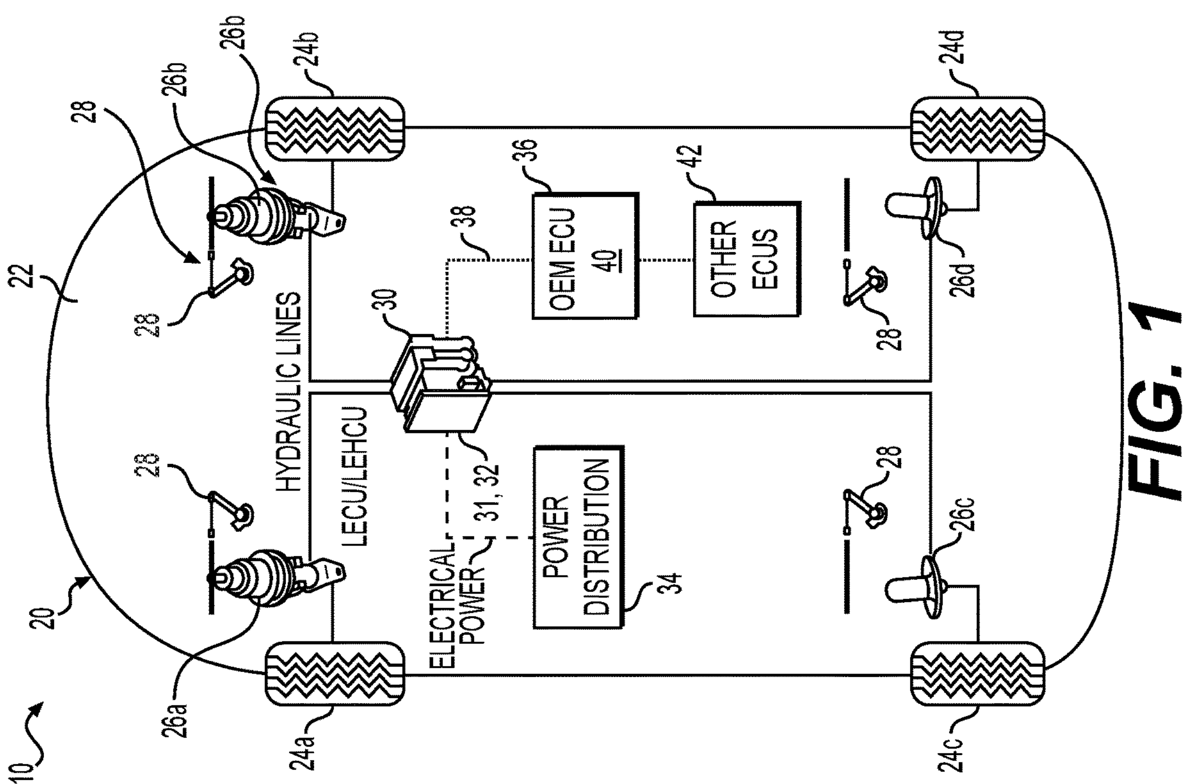
FIG. 1 shows a schematic block diagram of a vehicle with an independent corner lift (ICL) system, in accordance with an aspect of the present disclosure.

An independent corner lift (ICL) system 10 for a vehicle 20 such as a passenger car or truck is shown in FIG. 1. The vehicle 20 includes a body 22 and four wheels 24*a*, 24*b*, 24*c*, 24*d* attached thereto. The ICL system 10 provides for independent control of the height of the body 22 at each of the four wheels 24*a*, 24*b*, 24*c*. 24*d*. The ICL system 10 may, therefore, raise or lower the entire body or portions thereof. For example, the ICL system 10 may control pitch and roll of the body 22. The ICL system 10 may provide additional features, such as weight measurement at each of the four wheels 24*a*, 24*b*, 24*c*, 24*d*.

As shown in FIG. 1, the ICL system 10 includes a left-front lift actuator 26*a* operably disposed between a left-front wheel 24*a* and a corresponding point on the body 22. The ICL system 10 also includes a right-front lift actuator 26*b* operably disposed between a right-front wheel 24*b* and a corresponding point on the body 22. The ICL system 10 also includes a left-rear lift actuator 26*c* operably disposed between a left-rear wheel 24*c*, and a corresponding point on the body 22. The ICL system 10 also includes a right-rear lift actuator 26*d* operably disposed between a right-rear wheel 24*d* and a corresponding point on the body 22. The ICL system 10 also includes four height sensors 28, each of the height sensors 28 is configured to measure a height of a point on the body 22 relative to a corresponding one of the four wheels 24*a*, 24*b*, 24*c*, 24*d*. For example, the height sensors 28 may each measure an extension of a corresponding one of the lift actuators 26*a*. 26*b*, 26*c*. 26*d*.

The ICL system 10 also includes an intelligent lift controller 30, 31, 32 configured to control operation of each of the lift actuators 26*a*, 26*b*, 26*c*, 26*d*. The intelligent lift controller 30, 31, 32 includes a lift electronic control unit (LECU) 30 and a lift electro-hydraulic control unit (LEHCU) 31, 32. The LEHCU 31, 32 includes a lift electrical interface (LEI) 31 and a lift hydraulic control unit (LHCU) 32. The LECU 30 includes a controller, such as an electronic control unit, configured to command operation of the lift actuators 26*a*, 26*b*, 26*c*, 26*d* based on settings for corner heights of the vehicle 10 and based on feedback signals from sensors, such as the height sensors 28. The LHCU 32 controls hydraulic fluid flow to each of the lift actuators 26*a*, 26*b*, 26*c*. 26*d*. The LHCU 32 may include one or more control devices, such as pumps and/or valves to control the hydraulic fluid flow in response to control signals from the LECU 30. The LEI 31 may include one or more electrical devices, such as solenoid coils and/or one or more electric motors for actuating or otherwise controlling corresponding devices in the LHCU 32.

The vehicle 20 also includes a power distributer 34, such as an electrical bus, configured to supply electrical power to the intelligent lift controller 30, 32. The vehicle 20 also includes an original equipment manufacturer (OEM) electrical control unit (ECU) 36, such as a body control module (BCM) that sends a level control signal to the LECU 30 via a communications network 38. The communications network 38 may include, for example, an Ethernet interface or a controller area network (CAN) interface. The level control signal may indicate a desired height and/or attitude (e.g. pitch and/or roll) for the vehicle 20. The OEM ECU 36 may be in communication with one or more other ECUs 40, such as a powertrain control module (PCM) or a traction control module (TCM), and the OEM ECU 36 may be configured to use data from the one or more other ECUs 40 for generating the level control signal.

The LECU 30 may include actuator control software 60 for generating the commands for operating the one or more control devices of the LHCU 32 based on the signals from the sensors and based on the level control signal from the OEM ECU 36.

FIG. 2 shows a schematic block diagram of a controller 50 for the LECU 30 of the ICL system 10. The controller 50 includes a processor 52 coupled to a storage memory 54. The storage memory 54 includes an instruction storage 56 storing instructions, such as program code for execution by the processor 52. The storage memory 54 also includes a data storage 56 for holding data for use by the processor 52. The data storage 56 may record, for example, values of the parameters measured by one or more sensors and/or the outcome of functions calculated by the processor 52. The instruction storage 56 includes the actuator control software 60, which may be executed by the processor 52 to interpret the signals from the sensors, such as the height sensors 28, and to generate the commands for operating the one or more control devices of the LHCU 32.

Figure 3:
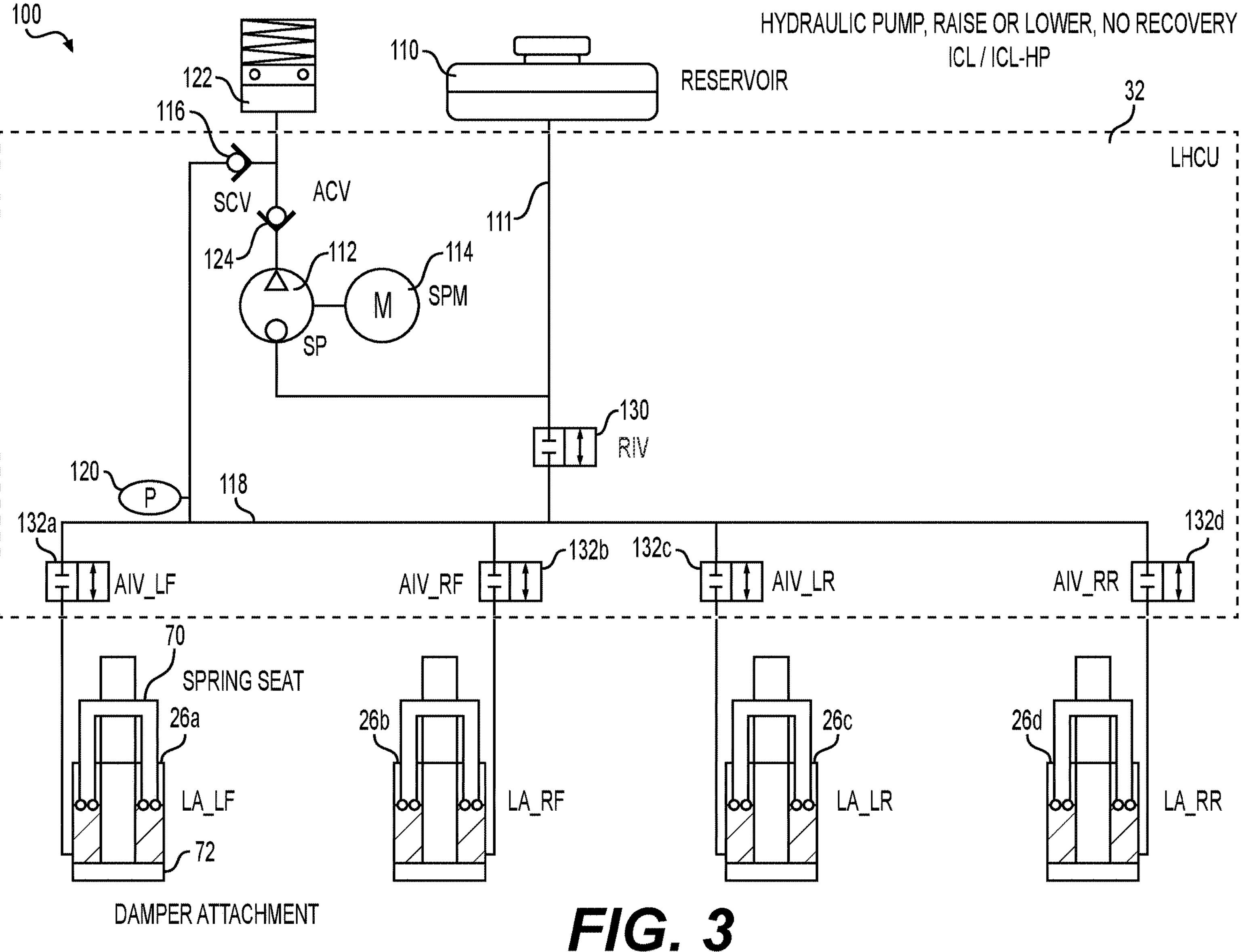
FIG. 3 shows a schematic diagram of a first hydraulic arrangement for the ICL system of the present disclosure.

FIG. 3 shows a schematic diagram of a first hydraulic arrangement 100 for the ICL system 10 of the present disclosure. The first hydraulic arrangement 100 includes a standard reservoir 110, such as a tank, that holds hydraulic fluid. The standard reservoir 110 may be open to atmosphere. The standard reservoir 110 functions to store hydraulic fluid for operation. The standard reservoir 110 may have a maximum volume determined by system operating characteristics, such as volumes of actuator, HCU and lines, and thermal expansion. The standard reservoir 110 may include a flow-back damping feature to avoid cap stress. The standard reservoir 110 may be configured to provide a flow rate to match a flow demand of a pump of the first hydraulic arrangement 100, plus some additional safety margin.

The first hydraulic arrangement 100 also includes the LHCU 32 which defines a supply passage 111 that is fluidly connected to the standard reservoir 110. The first hydraulic arrangement 100 also includes a supply pump (SP) 112 having an inlet port in fluid communication with the standard reservoir 110 via the supply passage 111. The supply pump is configured to pump hydraulic fluid from the standard reservoir 110 and to the lift actuators 26*a*, 26*b*, 26*c*, 26*d*. A supply pump motor (SPM) 114 is coupled to the supply pump 112 and functions to convert electrical energy to a mechanical energy by producing torque to drive a shaft of the supply pump 112. The supply pump 112 may include a vane pump, although other types of hydraulic pumps may be used.

The first hydraulic arrangement 100 also includes a supply check valve (SCV) 116 that allows fluid flow from the supply pump 112 to a first manifold 118 while blocking fluid flow in an opposite direction. The SCV 116 may function to isolate the supply pump 112 to prevent the supply pump 112 from being driven to rotate during a lowering phase. The SCV 116 may function to isolate the supply pump 112 from jounce pressure spike and/or to filter or smooth pressure variation from the supply pump 112.

The first hydraulic arrangement 100 also includes a pressure sensor 120 configured to measure a pressure of hydraulic fluid in the first manifold 118 and to communicate a signal indicative of that pressure to the LECU 30.

In some embodiments, and as shown in FIG. 3, the first hydraulic arrangement 100 also includes a first hydraulic accumulator 122 and an accumulator check valve (ACV) 124. The first hydraulic accumulator 122 includes a chamber in fluid communication with the first manifold 118 through SCV 116 with an accumulator piston disposed therein. The accumulator piston is movable in the chamber of the first hydraulic accumulator 122 a volume of fluid therein changes. A spring biases the piston of the first hydraulic accumulator 122 to push fluid out of the chamber of the first hydraulic accumulator 122. The first hydraulic accumulator 122 may function to maintain and stabilize pressure in the first manifold 118. The first hydraulic accumulator 122 may also damp pressure spikes during pump start and stop. The first hydraulic accumulator 122 may have a pressure design that is lower than weight pressure during rebound of corners. The ACV 124 is configured to allow fluid flow from the supply pump 112 to the first hydraulic accumulator 122 while blocking fluid flow in an opposite direction. The ACV 124 may function to lower leak rate of the AIVs 132*a*, 132*b*, 132*c*, 132*d* by delta P reduction holding.

The first hydraulic arrangement 100 also includes a reservoir isolation valve (RIV) 130 configure to selectively control fluid flow between the first manifold 118 and the supply passage 111, which may be at an ambient pressure due it is fluid communication with the standard reservoir 110. Thus, the RIV 130 may function to reduce pressure in the first manifold 118 by bleeding-off fluid to the supply passage 111. The RIV 130 may include a solenoid valve, which may be a normally-closed valve. The RIV 130 functions to allow or isolate hydraulic flow between the lift actuators 26*a*. 26*b*, 26*c*, 26*d* and the standard reservoir 110. The RIV 130 may have a self-locking orientation from the actuator side (i.e. from the first manifold 118). The RIV 130 may be configured to withstand a maximum differential pressure (maximum DeltaP) that corresponds to a 2 g jounce on corners while raising the lift actuators 26*a*, 26*b*, 26*c*, 26*d*. The RIV 130 may have a cracking pressure that is based on the maximum DeltaP.

The first hydraulic arrangement 100 also includes a plurality of actuator isolation valves (AIV) 132*a*, 132*b*, 132*c*, 132*d*, with each of the AIVs 132*a*, 132*b*, 132*c*, 132*d* configured to selectively control fluid flow between the first manifold 118 and a corresponding one of the lift actuators 26*a*, 26*b*, 26*c*, 26*d*. The AIVs 132*a*, 132*b*, 132*c*, 132*d* may each include a solenoid valve, which may have a normally-closed configuration. The AIVs 132*a*, 132*b*, 132*c*, 132*d* may each function to allow or isolate hydraulic flow between the supply pump 112 and the corresponding one of the lift actuators 26*a*, 26*b*, 26*c*, 26*d*. The AIVs 132*a*, 132*b*, 132*c*, 132*d* may each also function to allow or isolate hydraulic flow between the corresponding one of the lift actuators 26*a*, 26*b*, 26*c*, 26*d* and the standard reservoir 110. The AIVs 132*a*, 132*b*, 132*c*, 132*d* may have a self-locking orientation from the actuator side (i.e. from the corresponding one of the lift actuators 26*a*, 26*b*, 26*c*, 26*d*). Each of the AIVs 132*a*, 132*b*, 132*c*, 132*d* may be configured to withstand a maximum differential pressure (maximum DeltaP) in a downstream to upstream direction that corresponds to a 2 g jounce and 0 bar upstream. Each of the AIVs 132*a*, 132*b*, 132*c*, 132*d* may be configured to withstand a maximum differential pressure (maximum DeltaP) in an upstream to downstream direction that corresponds to a 2 g jounce on one corner while raising only this corner and rebound on another corner with 20 bar suspension spring preload. Each of the AIVs 132*a*, 132*b*, 132*c*, 132*d* may have a cracking pressure that is based on the maximum DeltaP.

Each of the lift actuators 26*a*, 26*b*, 26*c*. 26*d* may have a similar or identical configuration. As illustratively shown on the left-front lift actuator 26*a*, the lift actuators 26*a*, 26*b*, 26*c*, 26*d* may be disposed between a spring seat 70 and a damper attachment 72 of the corresponding corner of the vehicle 20. By moving between a retracted position and an extended position, the lift actuators 26*a*, 26*b*, 26*c*, 26*d* may change a distance between the spring seat 70 and the damper attachment 72, and thereby adjust the height of the corresponding corner of the vehicle 20. In other words, each of the lift actuators 26*a*, 26*b*, 26*c*, 26*d* may function to modify a distance between the corresponding one of the four wheels 24*a*, 24*b*, 24*c*, 24*d* and a corresponding spring seat or body and suspension top mount, which is connected to the body 22, and based on a volume of hydraulic fluid therein.

As shown in FIG. 3, the LHCU 32 defines the supply passage 111 and the first manifold 118 and contains the supply pump 112, the SCV 116, and each of the actuated valves 130, 132*a*, 132*b*, 132*c*, 132*d* of the first hydraulic arrangement 100.

Figure 4:
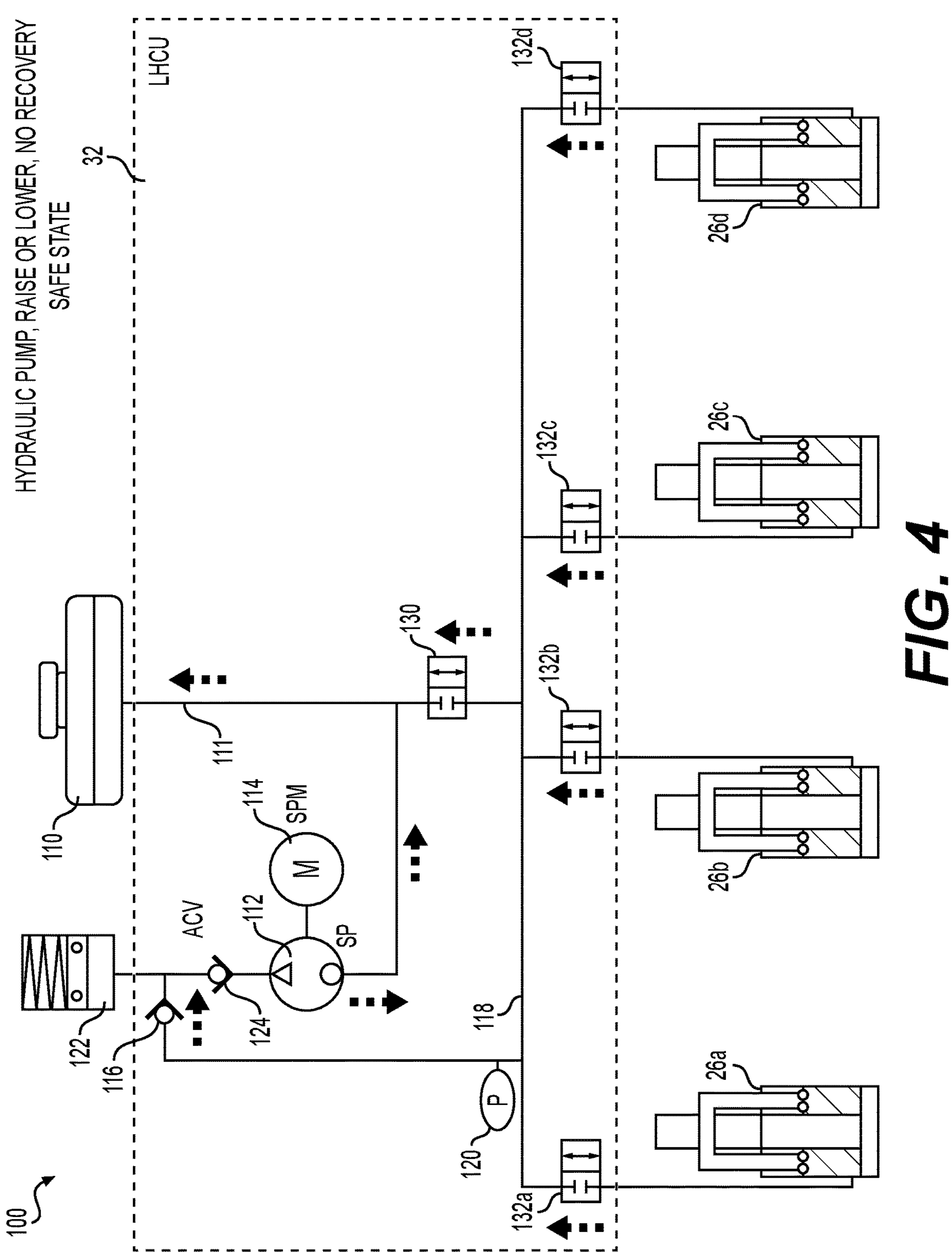
FIG. 4 shows a schematic diagram of the first hydraulic arrangement of FIG. 3 in a safe state.

FIG. 4 shows a schematic diagram of the first hydraulic arrangement 100 in a safe state, with no electrical power. In the safe state, all valves 130, 132*a*, 132*b*, 132*c*, 132*d* are closed, and the supply pump 112 is inactive. In the safe state, leakage by any of the valves is flowing back fluid to the standard reservoir 110 by the RIV 130 and the SCV 116. The first hydraulic arrangement 100 may have a leakage profile <0.12 cc/minute, inducing a loss <1.8 mm/hour. Such leakage may correspond to a full lowering in >55 hours for 100 mm lift and 100 cm3 per lift.

Figure 5:
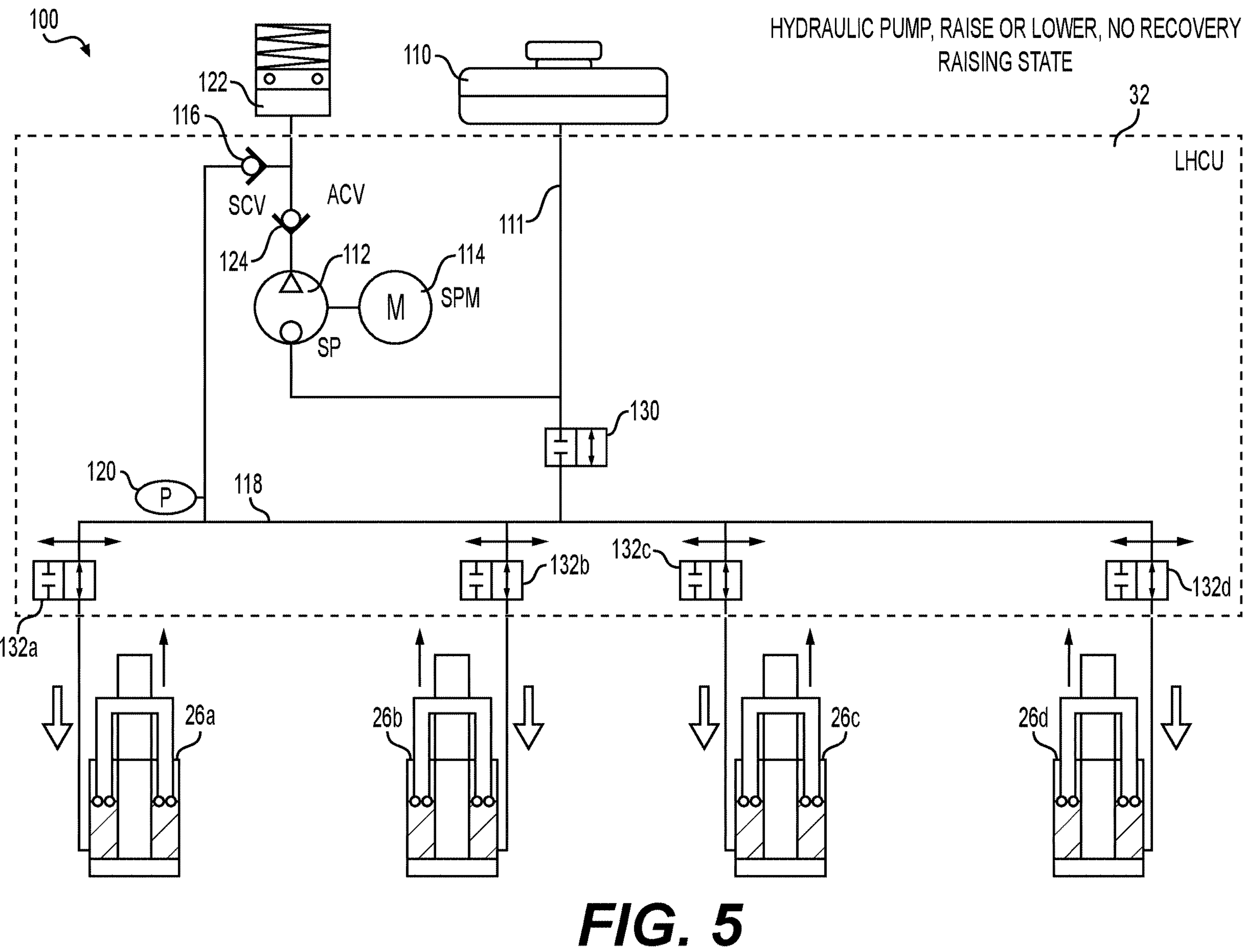
FIG. 5 shows a schematic diagram of the first hydraulic arrangement of FIG. 3 in a raising mode.

FIG. 5 shows a schematic diagram of the first hydraulic arrangement 100 in a raising mode, with the RIV 130 closed, and with each of the AIVs 132*a*, 132*b*, 132*c*. 132*d* opened. Arrows indicate that the supply pump 112 is turning to pump hydraulic fluid from the standard reservoir 110 and into each of the lift actuators 26*a*, 26*b*, 26*c*, 26*d* via the first manifold 118. The fluid is mainly flowing to the corner with the lowest pressure induced by the corner load. The AIVs 132*a*, 132*b*, 132*c*, 132*d* may be cycled between Opened and Closed states to minimize the side to side and front rear elevation dispersion. The AIVs 132*a*, 132*b*, 132*c*, 132*d* may be cycled using a period in the range of 200 ms.

Figure 6:
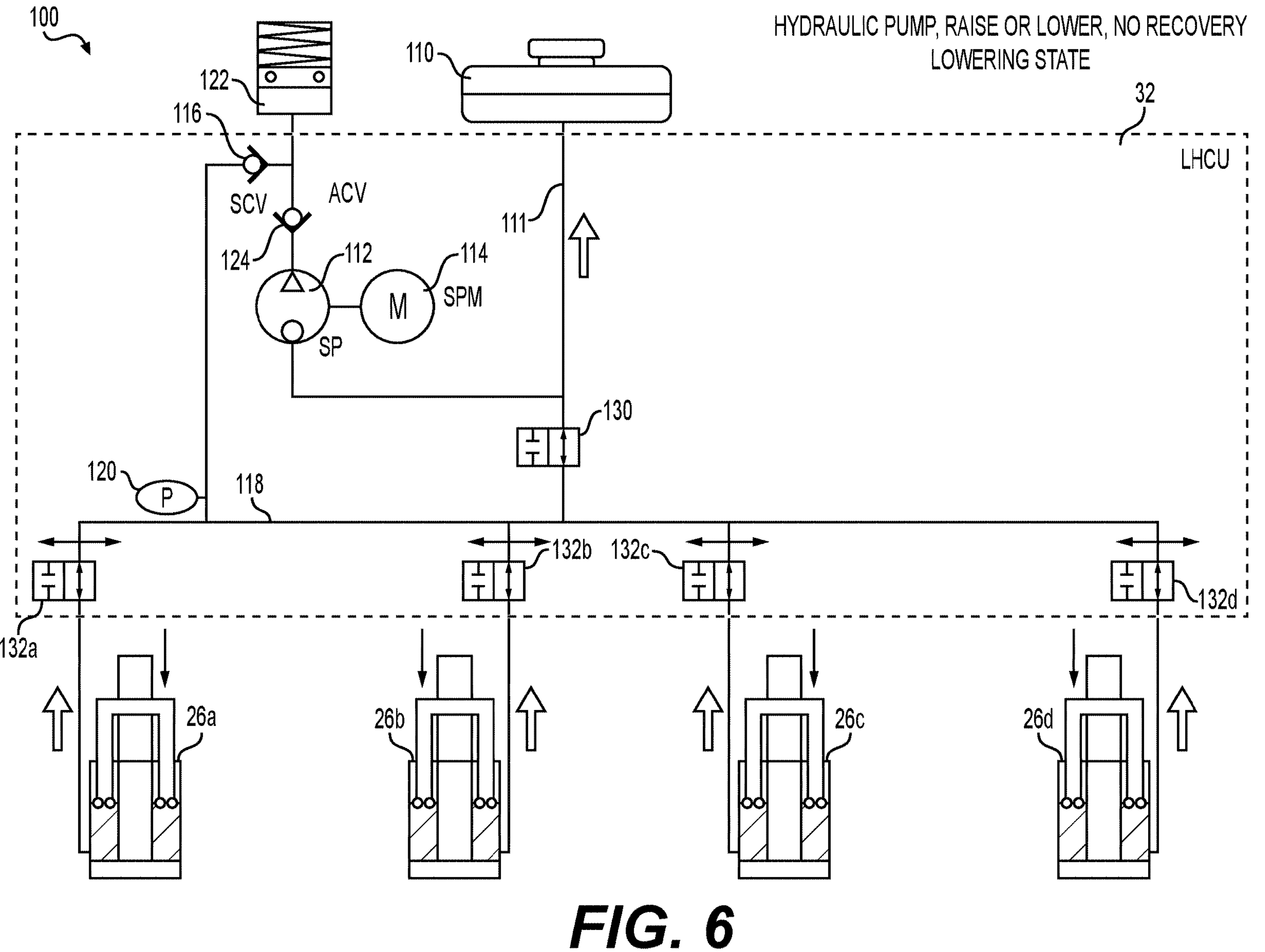
FIG. 6 shows a schematic diagram of the first hydraulic arrangement of FIG. 3 in a lowering mode.

FIG. 6 shows a schematic diagram of the first hydraulic arrangement 100 in a lowering mode with the RIV 130 is opened and each of the AIVs 132*a*, 132*b*, 132*c*, 132*d* are opened. In the lowering mode, the supply pump 112 is off, and hydraulic fluid flows from each of the lift actuators 26*a*, 26*b*, 26*c*, 26*d* to the standard reservoir 110. A corner of the vehicle 20 with the highest pressure induced by corner load is flowing more than the others. The AIVs 132*a*, 132*b*, 132*c*, 132*d* may be cycled between Opened and Closed states to minimize the side to side and front rear elevation dispersion. The AIVs 132*a*, 132*b*, 132*c*. 132*d* may be cycled using a period in the range of 200 ms.

Figure 7:
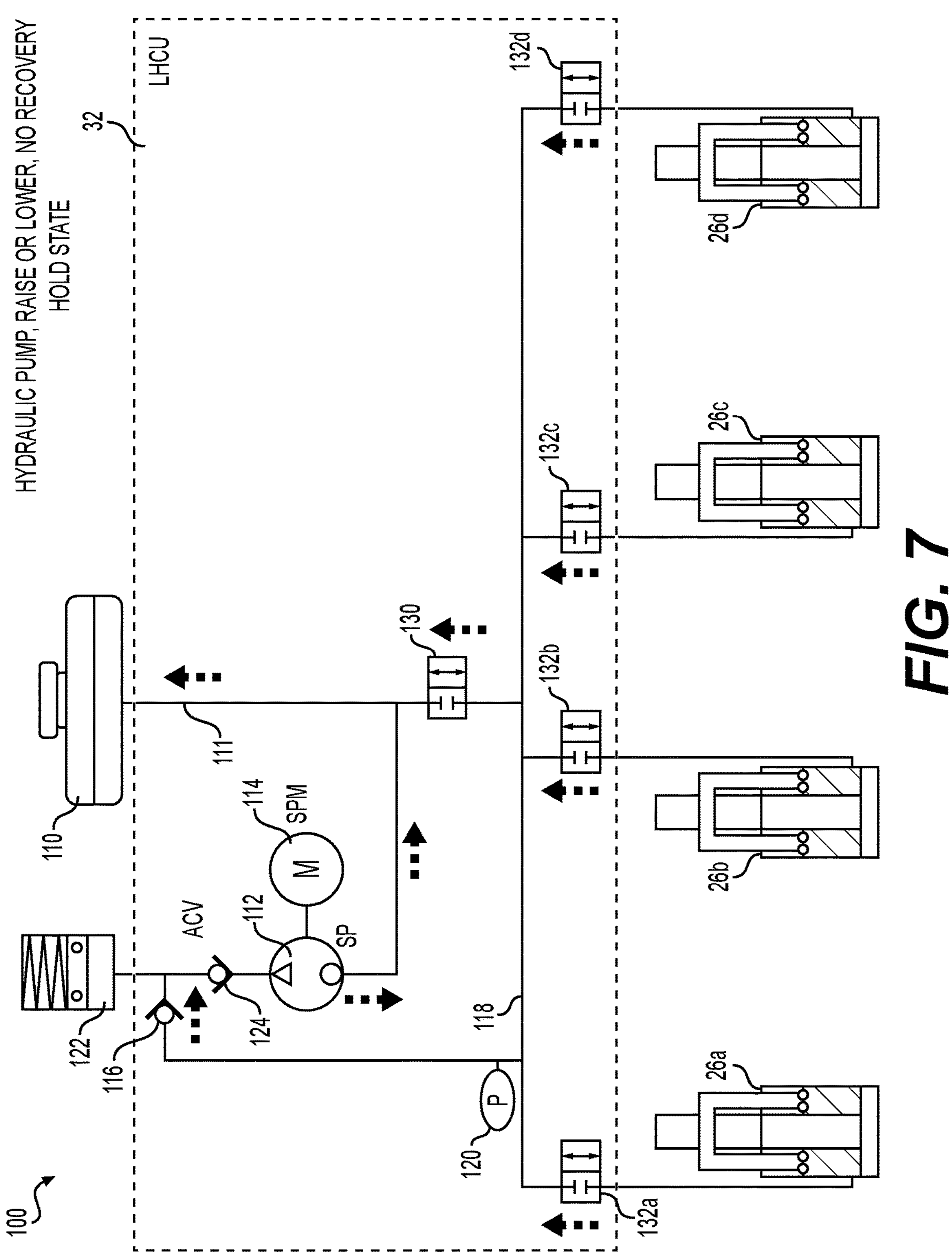
FIG. 7 shows a schematic diagram of the first hydraulic arrangement of FIG. 3 in a hold state.

FIG. 7 shows a schematic diagram of the first hydraulic arrangement 100 in a hold state, in which the RIV 130 is closed and each of the AIVs 132*a*, 132*b*, 132*c*, 132*d* are closed. In the hold state, the supply pump 112 is off. Valve leakage is flowing back fluid to the standard reservoir 110 by the RIV 130 and the SCV 116. The first hydraulic arrangement 100 may have a leakage profile <0.12 cc/minute, inducing a loss <1.8 mm/hour. Such leakage may correspond to a full lowering in >55 hours for 100 mm lift and 100 cm3 per lift.

Figure 8:
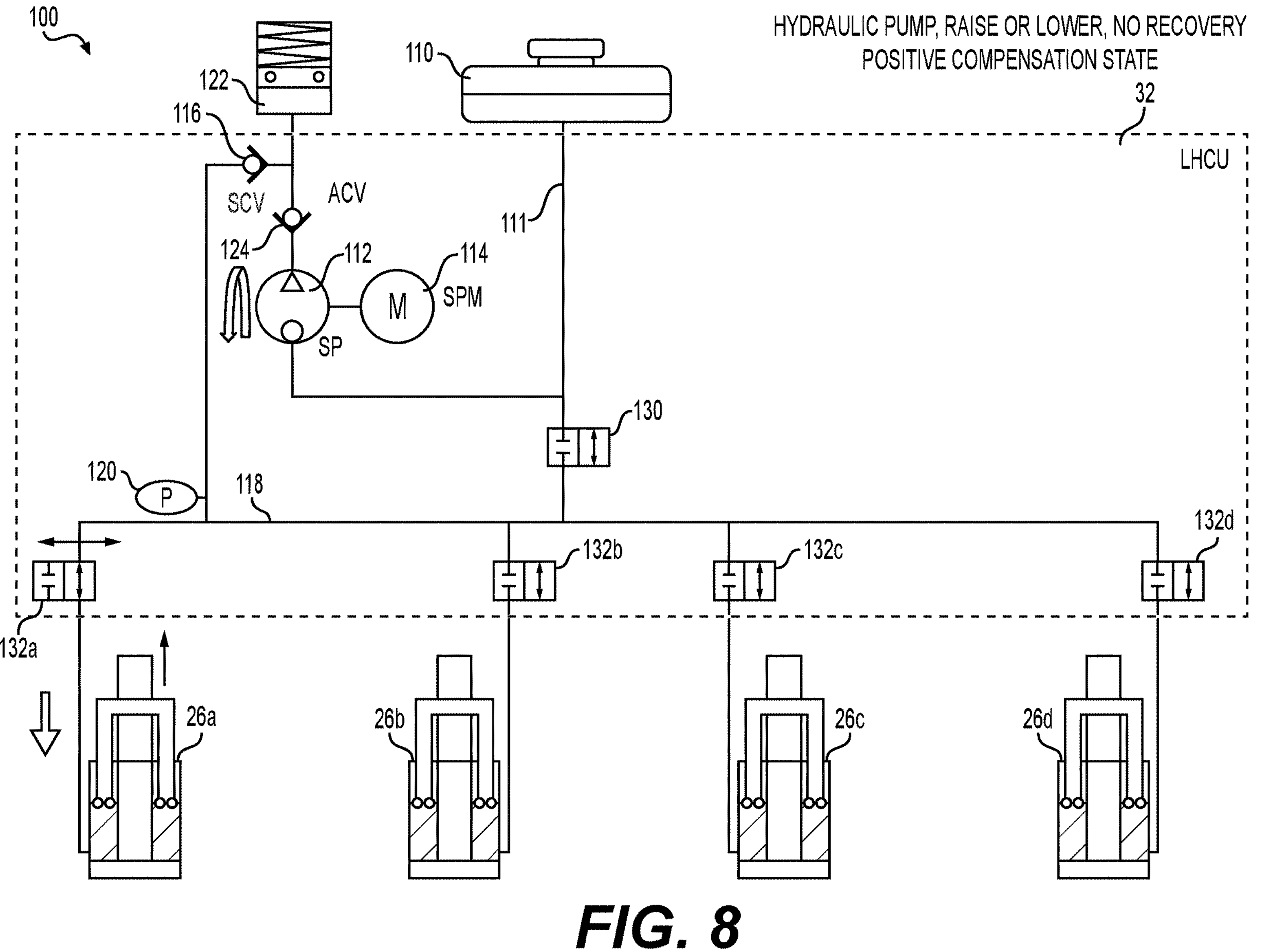
FIG. 8 shows a schematic diagram of the first hydraulic arrangement of FIG. 3 in a positive compensation state.

FIG. 8 shows a schematic diagram of the first hydraulic arrangement 100 in a positive compensation state, with the RIV 130 closed, and with each of the AIVs 132*a*, 132*b*, 132*c*, 132*d* opened or closed to lift the corresponding corner. Arrows indicate that the supply pump 112 is turning to pump hydraulic fluid from the standard reservoir 110 and into the left-front lift actuator 26*a* via the first manifold 118 and the left-front AIV 132*a*, which is opened. The supply pump 112 generates pressure inducing fluid flow to lift against the load on one or more of the lift actuators 26*a*, 26*b*, 26*c*, 26*d*. The AIVs 132*a*, 132*b*, 132*c*, 132*d* are opened and then Closed when a desired volume is accumulated in the corresponding one of the lift actuators 26*a*, 26*b*, 26*c*, 26*d*. The compensation may be estimated based on a body to wheel position variation over time combined with weight pressure measurements. The measurements may be performed during a static use case combined with slope estimation and dynamic use cases combined with constant velocity and slope estimation.

Figure 9:
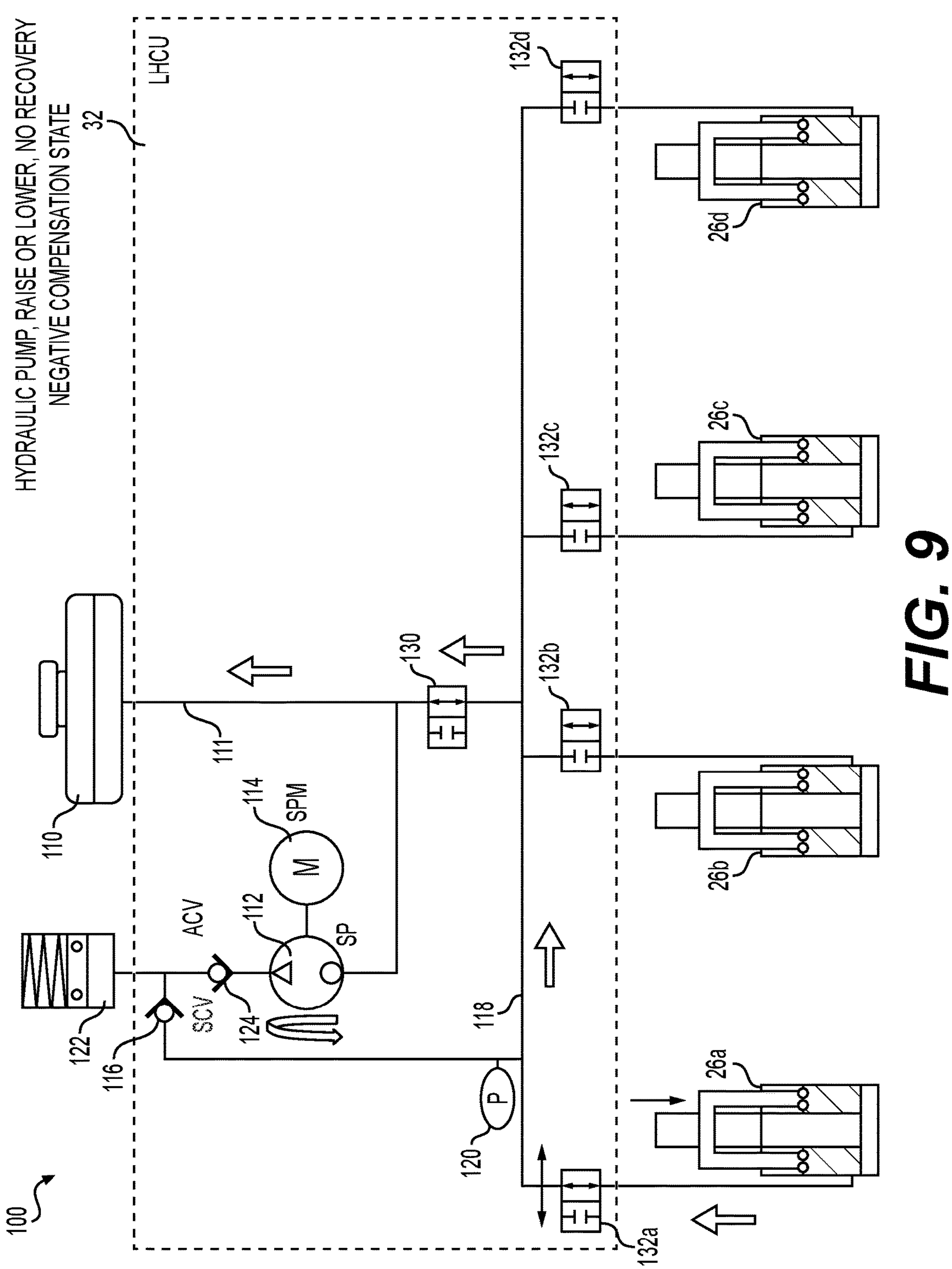
FIG. 9 shows a schematic diagram of the first hydraulic arrangement of FIG. 3 in a negative compensation state.

FIG. 9 shows a schematic diagram of the first hydraulic arrangement 100 in a negative compensation state, with the supply pump 112 off, the RIV 130 opened, and with each of the AIVs 132*a*, 132*b*, 132*c*, 132*d* opened or closed to lower the corresponding corner. Arrows indicate that hydraulic fluid flows from the left-front lift actuator 26*a* to the standard reservoir 110 via the first manifold 118 and the left-front AIV 132*a*, which is opened. In the negative compensation state, excess pressure in one or more of the lift actuators 26*a*, 26*b*, 26*c*, 26*d*, which may result from thermal expansion or overshoot in raising mode or positive compensation state, can be adjusted. In the negative compensation state, the RIV 130 and one or more of the AIVs 132*a*, 132*b*, 132*c*, 132*d* are opened and then closed when a desired volume is accumulated in the corresponding one of the lift actuators 26*a*, 26*b*, 26*c*, 26*d*. The compensation may be estimated based on a body to wheel position variation over time combined with weight pressure measurements. The measurements may be performed during a static use case combined with slope estimation and dynamic use cases combined with constant velocity and slope estimation.

Figure 10:
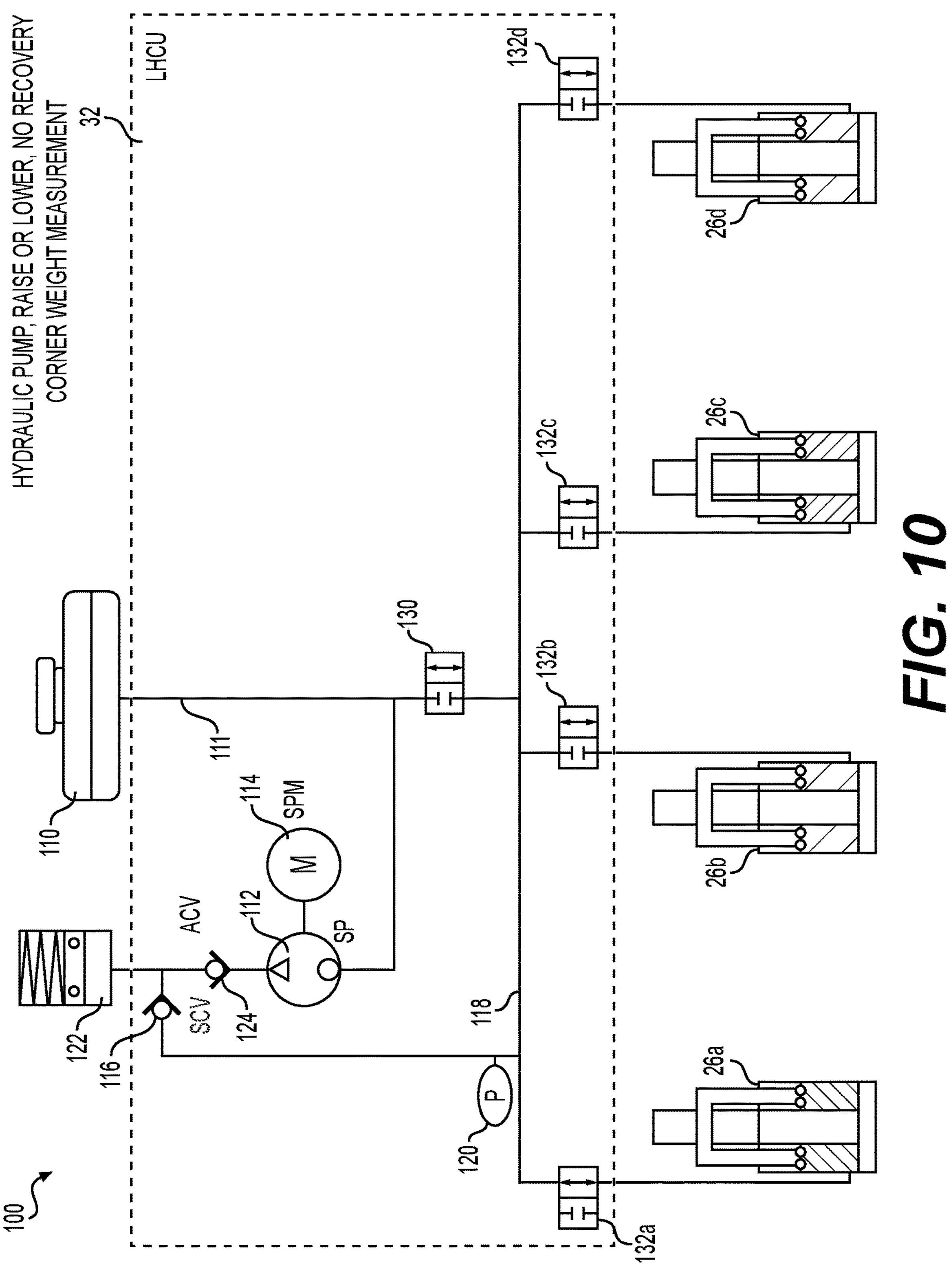
FIG. 10 shows a schematic diagram of the first hydraulic arrangement of FIG. 3 in a corner weight measurement mode.

FIG. 10 shows a schematic diagram of the first hydraulic arrangement of 100 in a corner weight measurement mode, with the supply pump 112 off, the RIV 130 closed, and with each of the AIVs 132*a*, 132*b*, 132*c*, 132*d* opened or closed to measure a weight of the corresponding corner. The corner weight measurement may be performed with the vehicle 20 in static on flat or with slope compensation or while the vehicle 20 is moving with steady velocity (no acceleration) on flat or with slope compensation. The fluid pressure corresponding to the weight on a corner is measured by opening the AIVs 132*a*, 132*b*, 132*c*, 132*d* of each corner one-by-one and in sequence. The pressure sensor 120 may measure the fluid pressure in the first manifold 118 during a time when each of the AIVs 132*a*, 132*b*, 132*c*, 132*d* is opened to measure the fluid pressure corresponding to the weights in each of the corners of the vehicle 20. The HCU compliance being low, this measure does not create perturbation on corner height. All other corner being isolated, road profiles or initial cornering situations are not impacting vehicle dynamic.

Figure 11:
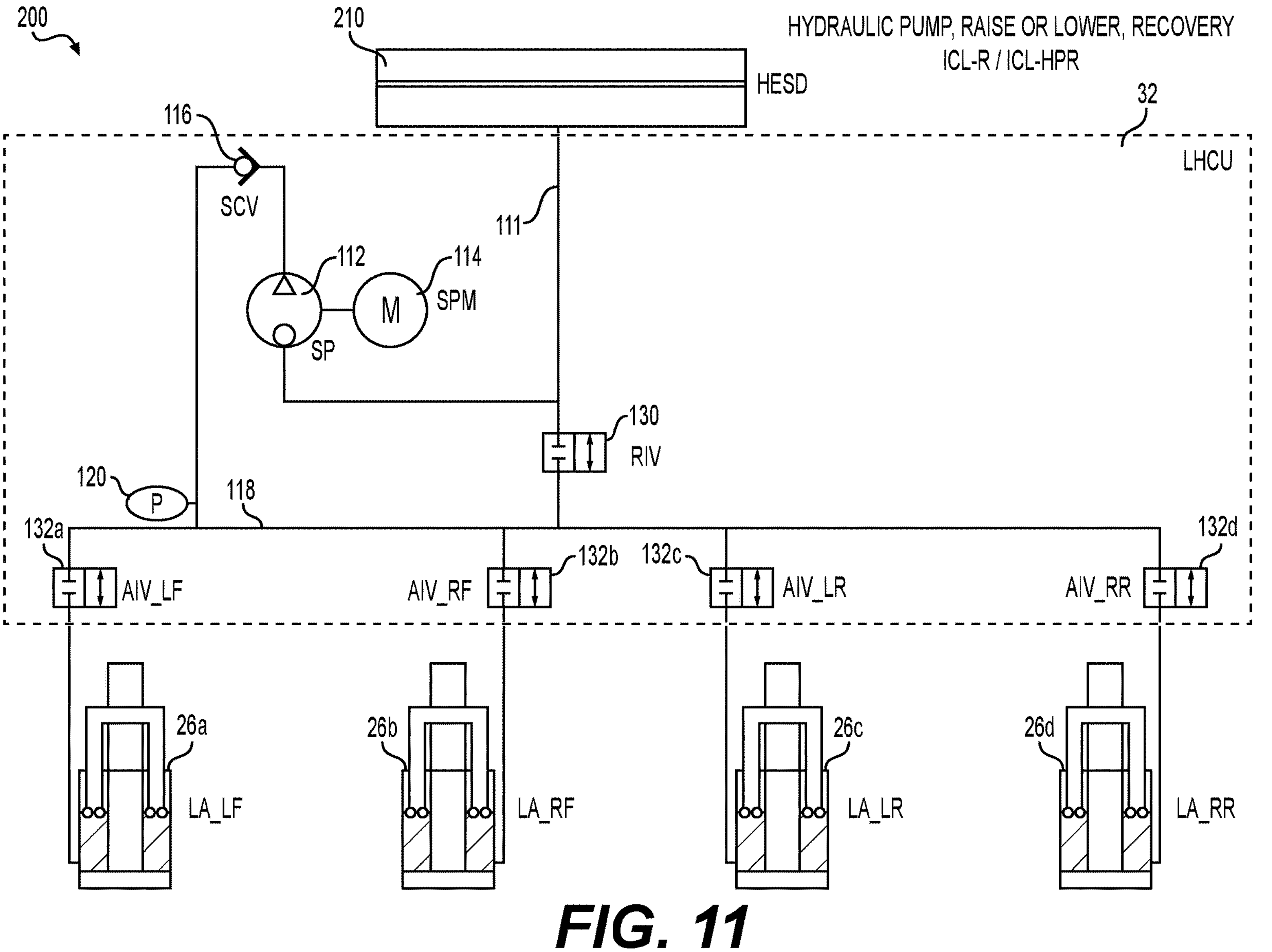
FIG. 11 shows a schematic diagram of a second hydraulic arrangement for the ICL system of the present disclosure.

FIG. 11 shows a schematic diagram of a second hydraulic arrangement 200 for the ICL system 10 of the present disclosure. The second hydraulic arrangement 200 may be similar or identical to the first hydraulic arrangement 100, except for the substitution of a Hydraulic Energy Storage Device (HESD) 210 in place of the standard reservoir 110. The HESD 210 may function to store hydraulic energy based on inlet flow energy. For example, the HESD 210 may include a compressible fluid (i.e. a gas) in a sealed compartment to store hydraulic energy based on the inlet flow of the hydraulic fluid. The HESD 210 may include diaphragm separating the hydraulic fluid from the compressible fluid.

Figure 12:
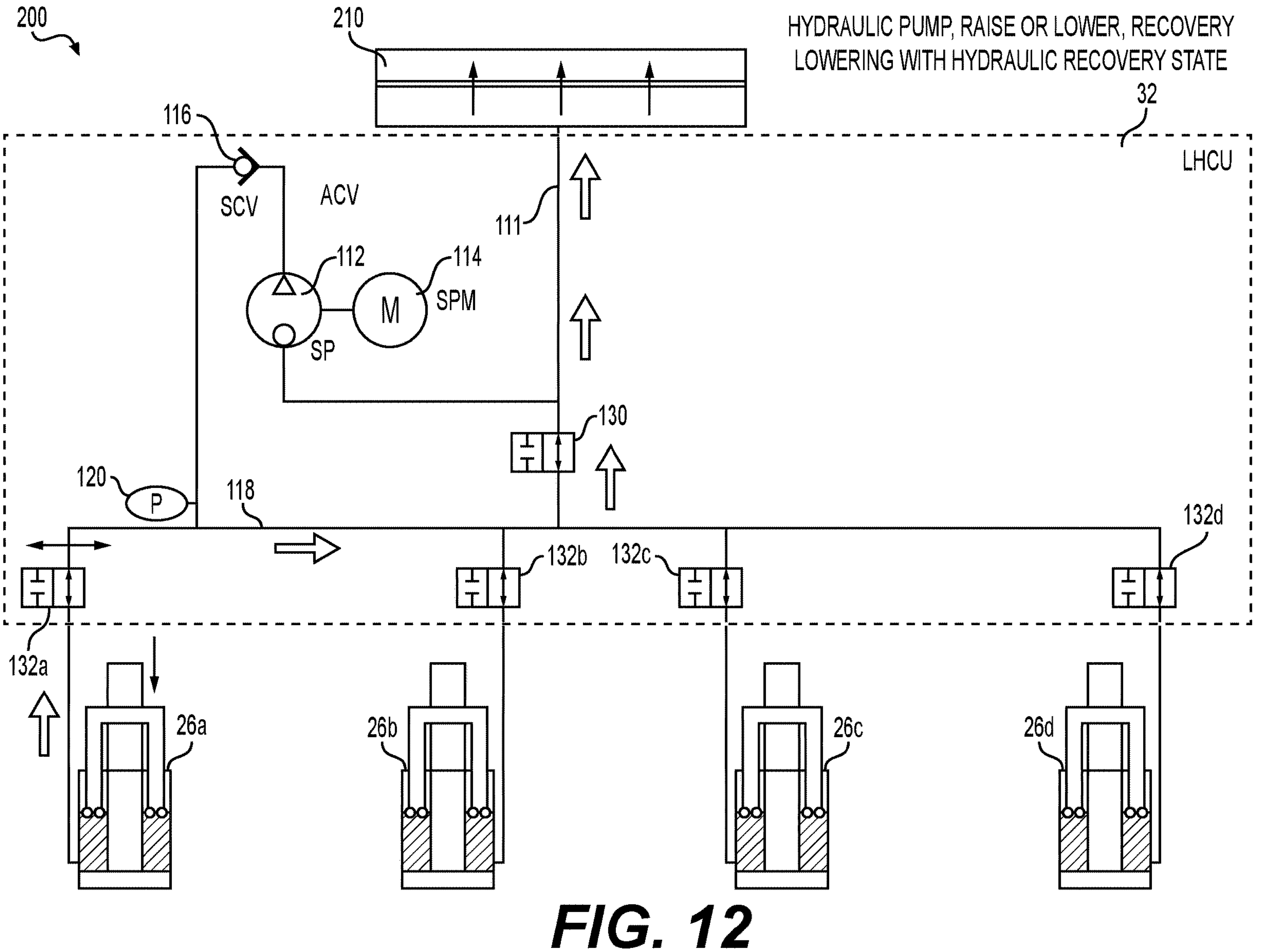
FIG. 12 shows a schematic diagram of the second hydraulic arrangement of FIG. 11 in a Lowering with Hydraulic Recovery State.

FIG. 12 shows a schematic diagram of the second hydraulic arrangement 200 in a Lowering with Hydraulic Recovery State, with hydraulic fluid flowing from one or more of the lift actuators 26*a*, 26*b*, 26*c*, 26*d* and to the HESD 210. In this mode, the lowering pressure has to be higher than the maximum HESD pressure with full fluid volume with a margin factor. The minimum lowering pressure is given by the suspension spring preload. Recovery may be dependent on the suspension characteristics for this design with direct recovery from one or more of the lift actuators 26*a*, 26*b*, 26*c*, 26*d* to the HESD 210, which functions as a hydraulic accumulator.

Figure 13:
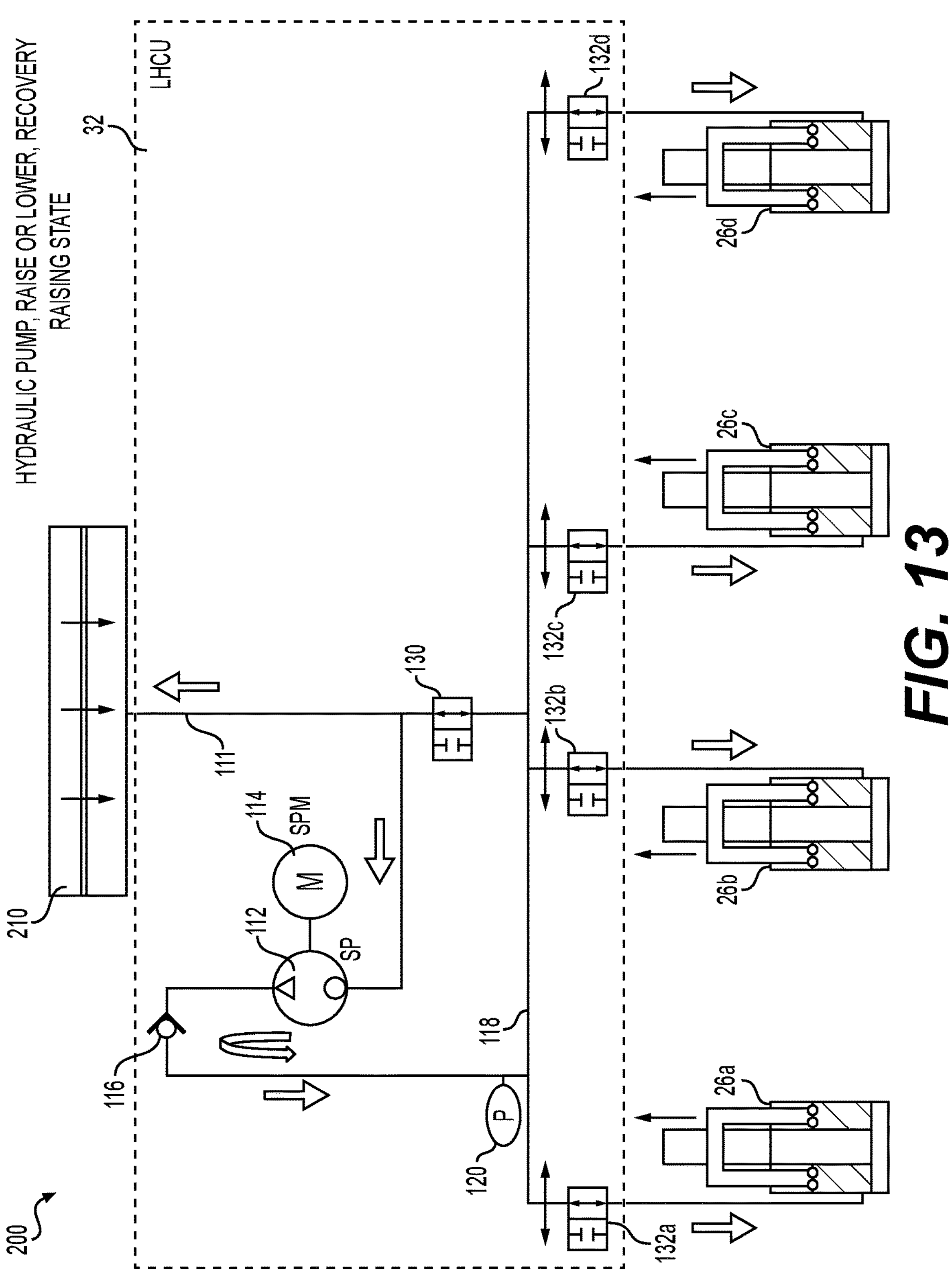
FIG. 13 shows a schematic diagram of the second hydraulic arrangement of FIG. 11 in a raising mode.

FIG. 13 shows a schematic diagram of the second hydraulic arrangement 200 in a raising mode, with hydraulic fluid flowing into the lift actuators 26*a*, 26*b*, 26*c*, 26*d*. In the raising mode, the supply pump 112 generates pressure inducing fluid flow to lift against the load on the lift actuators 26*a*, 26*b*, 26*c*, 26*d*. The supply pump 112 is preloaded by the HESD 210. The net torque required to run the supply pump motor 114 to raise is lower compared to a standard reservoir 110 at atmospheric pressure.

Figure 14:
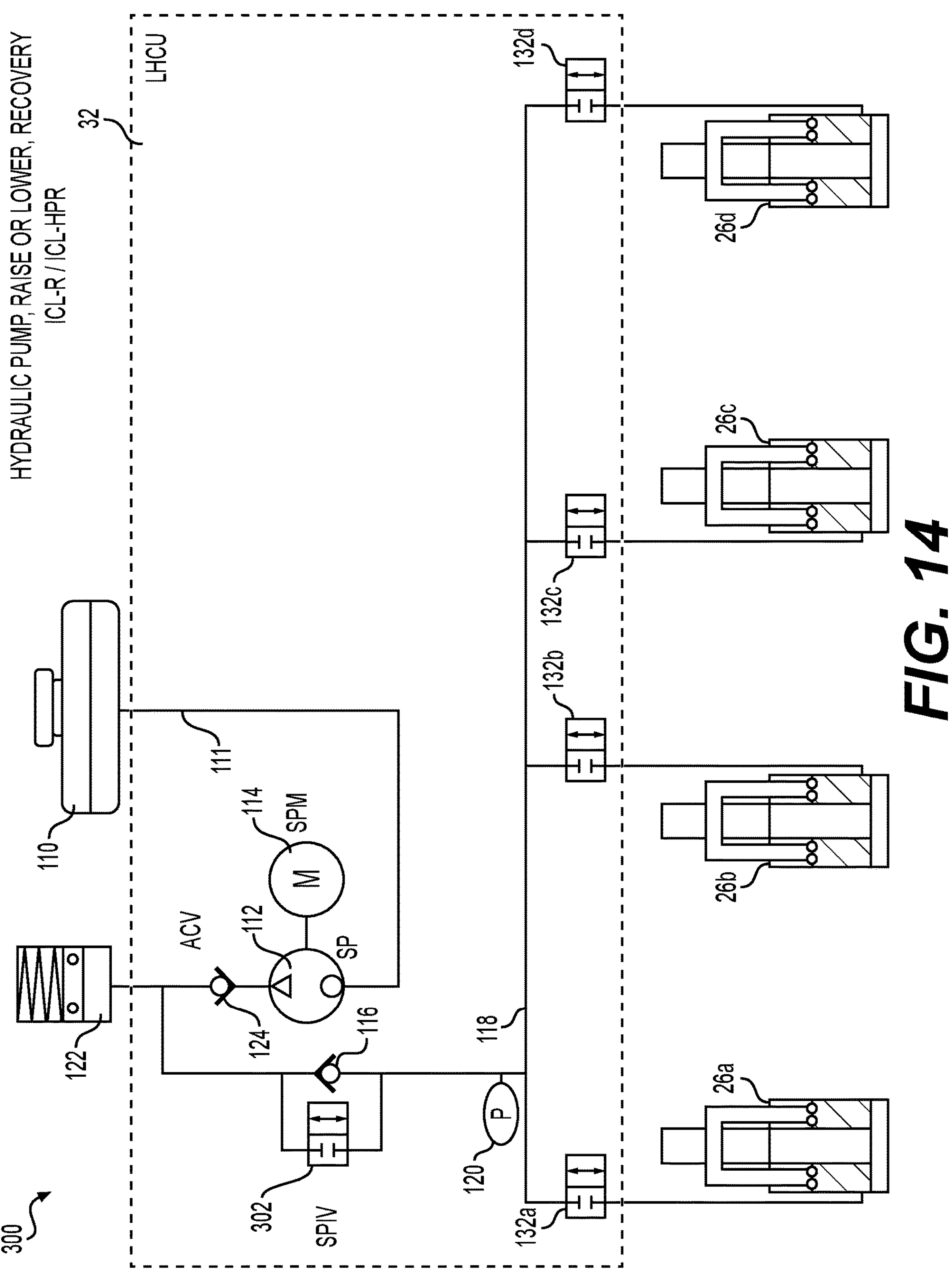
FIG. 14 shows a schematic diagram of a third hydraulic arrangement for the ICL system of the present disclosure.

FIG. 14 shows a schematic diagram of a third hydraulic arrangement 300 for the ICL system 10 of the present disclosure. The third hydraulic arrangement 300 may be similar or identical to the first hydraulic arrangement 100, except for the addition of a supply pump isolation valve (SPIV) 302 configured to bypass hydraulic fluid around the SCV 116. The SPIV 302 may include a solenoid valve, which may be a normally-closed valve. The SPIV 302 may function to allow corner pressure measurement without losses in the supply pump 112. The SPIV 302 may authorize reverse flow through the supply pump 112, in certain cases. The SPIV 302 can provide increased flow from the supply pump 112, when compared to the first hydraulic arrangement 100 in which all flow from the supply pump 112 is directed through the SCV 116. As shown in FIG. 14, the LHCU 32 defines the supply passage 111 and the first manifold 118 and contains the supply pump 112, the SCV 116, the ACV 124, and each of the actuated valves 130, 132*a*, 132*b*, 132*c*, 132*d*, and 302 of the third hydraulic arrangement 300.

Figure 15:
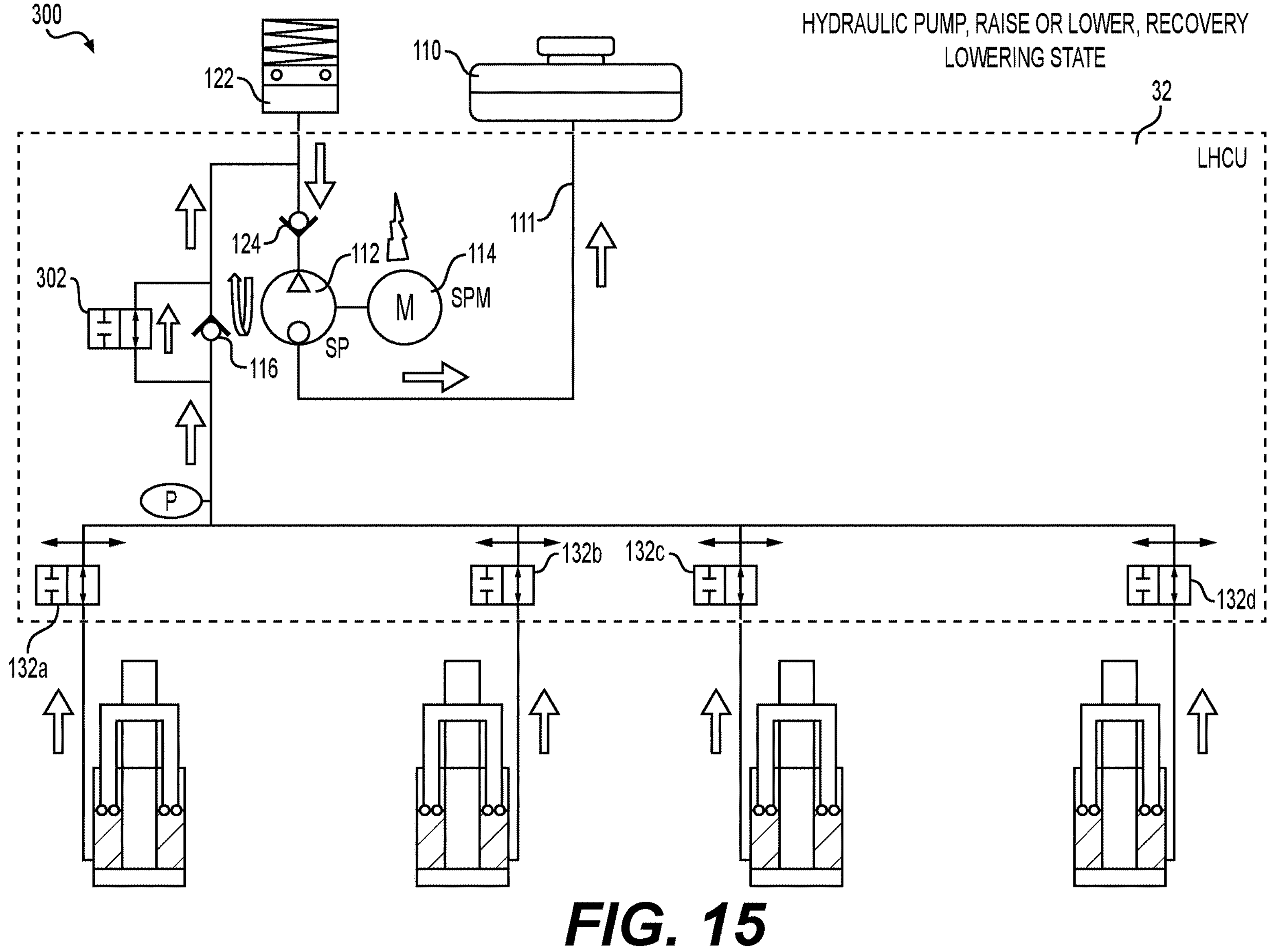
FIG. 15 shows a schematic diagram of the third hydraulic arrangement of FIG. 14 in a lowering mode.

FIG. 15 shows a schematic diagram of the third hydraulic arrangement 300 in a Lowering with Hydraulic Recovery mode, with hydraulic fluid flowing from one or more of the lift actuators 26*a*, 26*b*, 26*c*, 26*d* and to the standard reservoir 110. In this mode, the lowering pressure causes a flow of the hydraulic fluid through the supply pump 112, turning the supply pump 112 in reverse. The pump motor 114 is operable as a generator to recover hydraulic energy as electrical energy during the lowering mode, with the supply pump 112 being driven in the reverse direction by the flow of the hydraulic fluid therethrough. Flowing the hydraulic fluid through the supply pump 112 in the reverse direction may require the ACV 124 to be omitted and/or bypassed.

Figure 16:
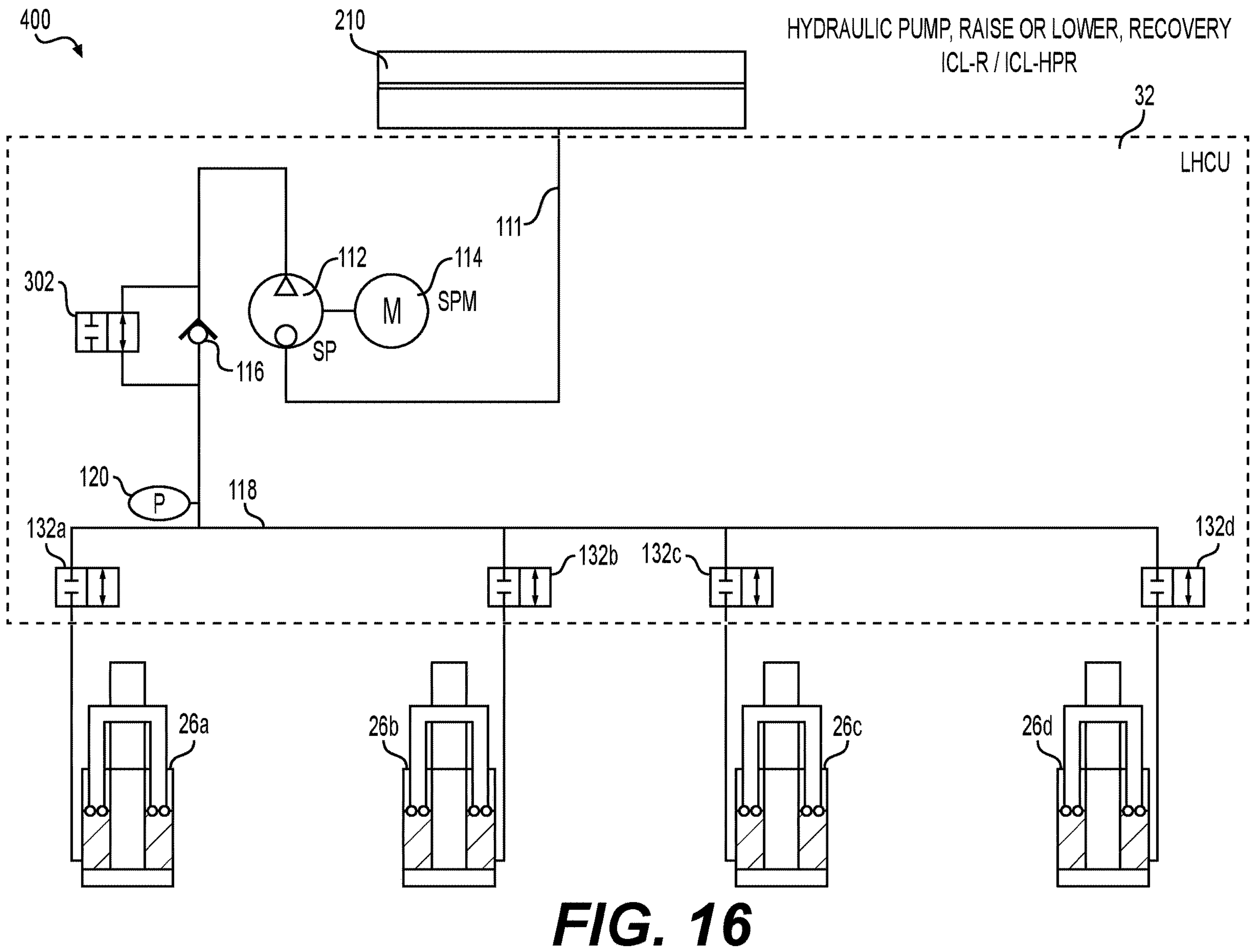
FIG. 16 shows a schematic diagram of a fourth hydraulic arrangement for the ICL system of the present disclosure.

FIG. 16 shows a schematic diagram of a fourth hydraulic arrangement 400 for the ICL system 10 of the present disclosure. The fourth hydraulic arrangement 400 may be similar or identical to the third hydraulic arrangement 300, except for the substitution of the Hydraulic Energy Storage Device (HESD) 210 in place of the standard reservoir 110.

Figure 17:
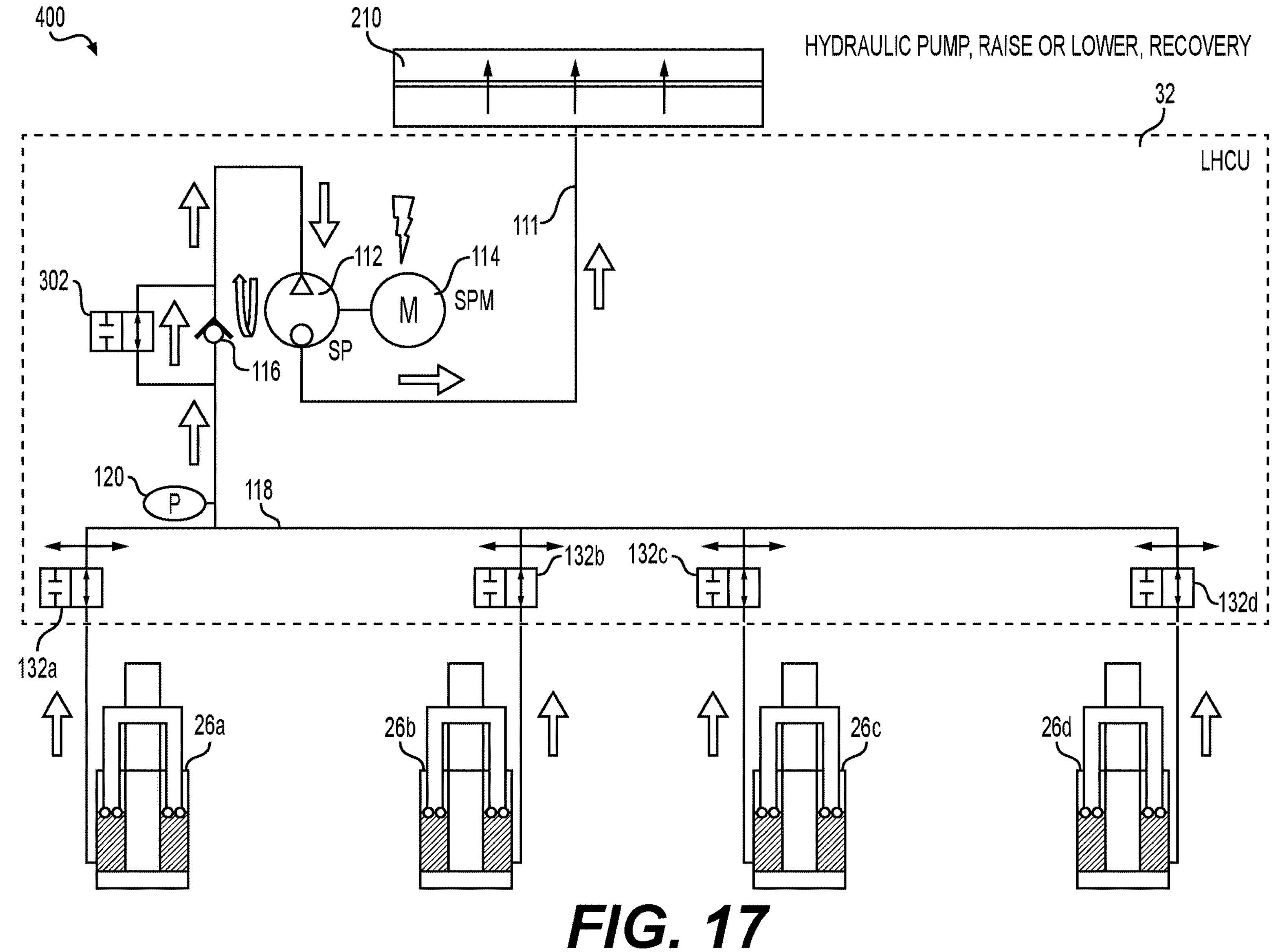
FIG. 17 shows a schematic diagram of the fourth hydraulic arrangement of FIG. 16, in a lowering with hydraulic recovery mode.

FIG. 17 shows a schematic diagram of the fourth hydraulic arrangement 400 in a lowering with hydraulic recovery mode, with hydraulic fluid flowing from one or more of the lift actuators 26*a*. 26*b*, 26*c*, 26*d* and to the HESD 210. In this mode, the lowering pressure from the lift actuators 26*a*, 26*b*, 26*c*, 26*d* pressurizes the pump inlet to flow the fluid back against the pressurized fluid storage of the HESD 210.

Figure 18:
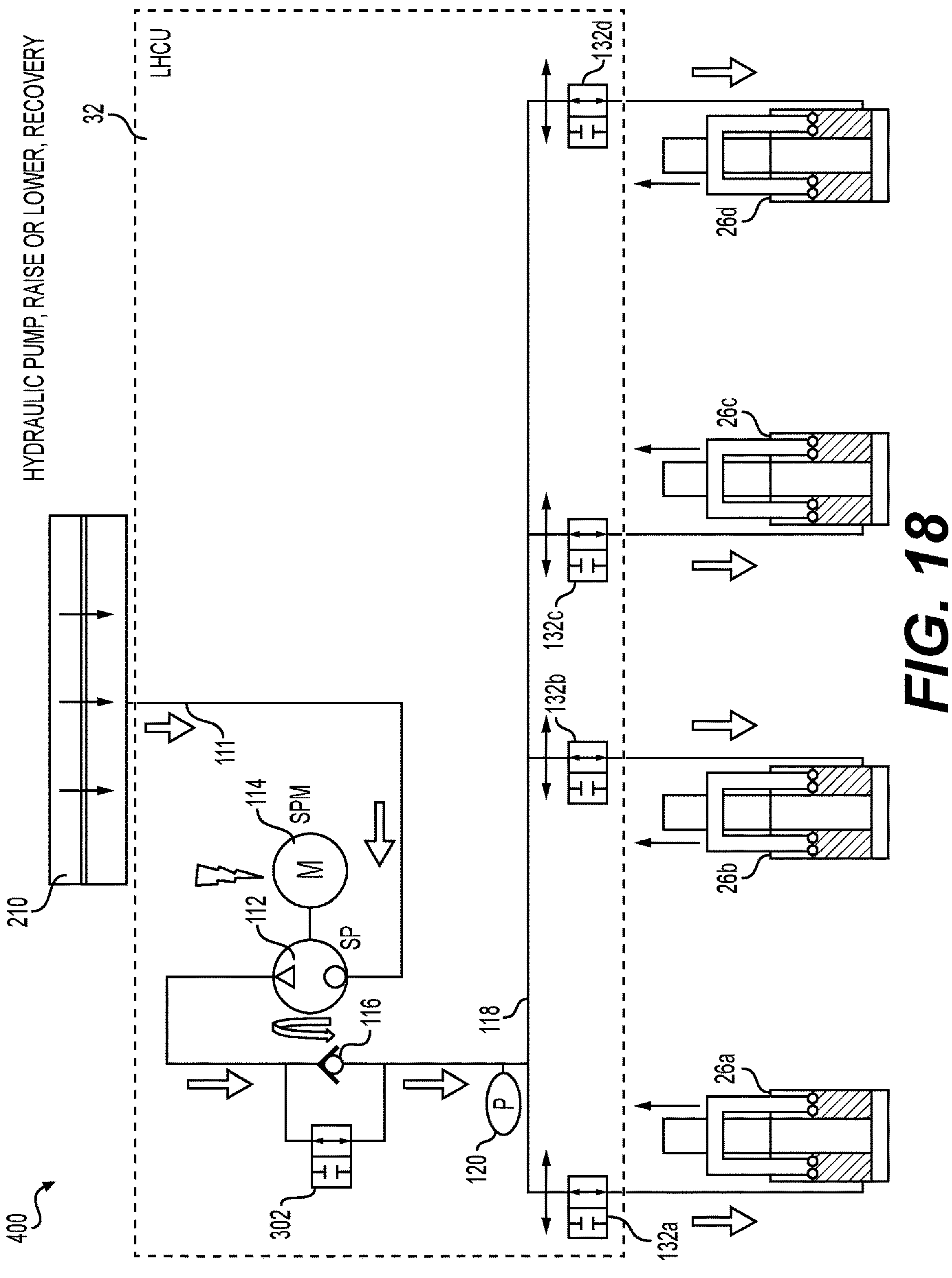
FIG. 18 shows a schematic diagram of the fourth hydraulic arrangement of FIG. 16, in a raising mode.

FIG. 18 shows a schematic diagram of the fourth hydraulic arrangement of FIG. 16, in a raising mode, in which the supply pump 112 generates pressure inducing fluid flow to lift against the load on the lift actuators 26*a*, 26*b*, 26*c*, 26*d*. The supply pump 112 is preloaded by the HESD 210. The net torque required to run the supply pump motor 114 to raise the body 22 of the vehicle 20 is lower compared to a standard reservoir 110 at atmospheric pressure.

Figure 19:
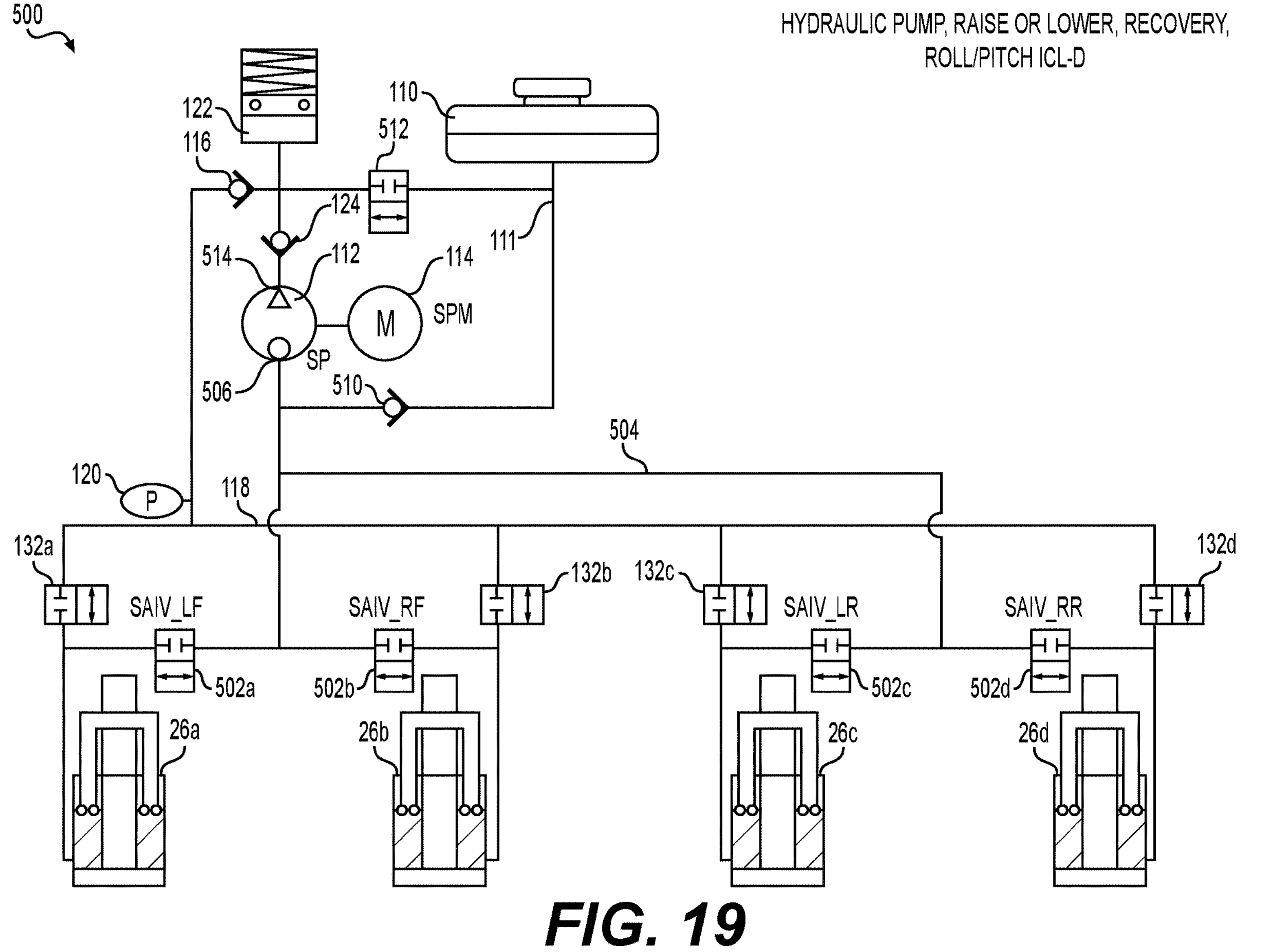
FIG. 19 shows a schematic diagram of a fifth hydraulic arrangement for the ICL system of the present disclosure.

FIG. 19 shows a schematic diagram of a fifth hydraulic arrangement 500 for the ICL system 10 of the present disclosure. The fifth hydraulic arrangement 500 may be similar or identical to the first hydraulic arrangement 100, except for a few additional features described herein. The fifth hydraulic arrangement 500 includes a Secondary Actuator Isolation Valve (SAIV) 502*a*, 502*b*, 502*c*, 502*d* coupled to each of the lift actuators 26*a*, 26*b*, 26*c*, 26*d* and configured to selectively control fluid flow between the lift actuators 26*a*, 26*b*, 26*c*, 26*d* and a return fluid passage 504 in fluid communication with an inlet port 506 of the supply pump 112. Each of the SAIVs 502*a*, 502*b*, 502*c*, 502*d* may include a solenoid valve, which may be a normally-closed valve. The SAIVs 502*a*, 502*b*, 502*c*, 502*d* may function to selectively allow or isolate hydraulic flow between the inlet port 506 of the supply pump 112 and the lift actuators 26*a*, 26*b*, 26*c*, 26*d*. The SAIVs 502*a*, 502*b*, 502*c*, 502*d* may have a self-locking orientation from the actuator side (i.e. from the corresponding one of the lift actuators 26*a*, 26*b*, 26*c*, 26*d*). Each of the SAIVs 502*a*, 502*b*, 502*c*, 502*d* may be configured to withstand a maximum differential pressure (maximum DeltaP) in a downstream to upstream direction that corresponds to a 2 g jounce and 0 bar upstream. Each of the SAIVs 502*a*, 502*b*, 502*c*, 502*d* may be configured to withstand a maximum differential pressure (maximum DeltaP) in an upstream to downstream direction that corresponds to a 2 g jounce on one corner while raising only this corner and rebound on another corner with 20 bar suspension spring preload. Each of the SAIVs 502*a*, 502*b*, 502*c*, 502*d* may have a cracking pressure that is based on the maximum DeltaP.

The fifth hydraulic arrangement 500 also includes a return check valve 510 configured to allow fluid flow from the supply passage 111 and to the return fluid passage 504, while blocking fluid flow in an opposite direction. The fifth hydraulic arrangement 500 also includes a supply control valve 512 configured to selectively control fluid flow between an outlet port 514 of the supply pump 112 and the supply passage 111. The supply control valve 512 may include a solenoid valve, which may have a normally-closed configuration.

Figure 20:
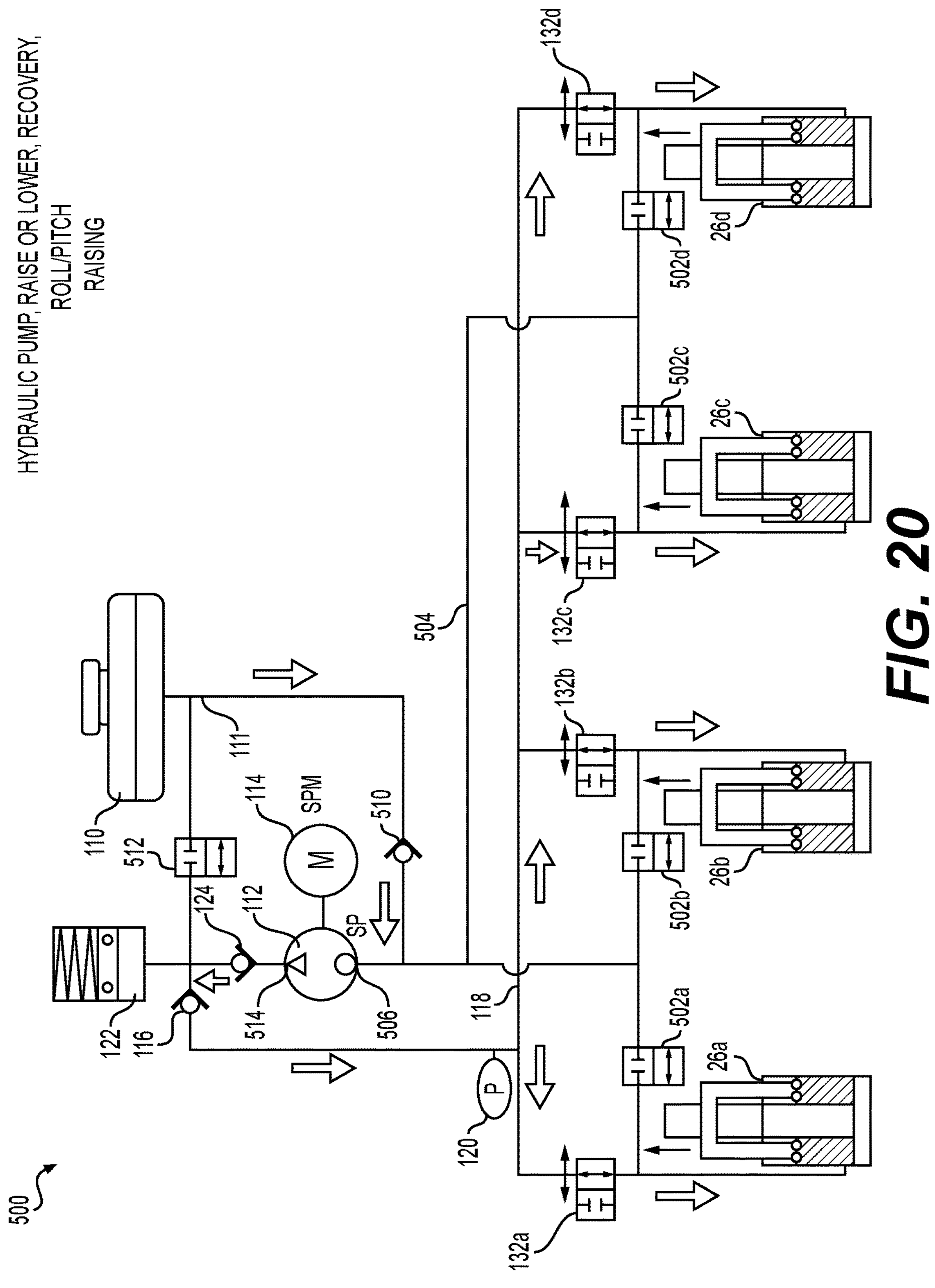
FIG. 20 shows a schematic diagram of the fifth hydraulic arrangement of FIG. 19, in a raising mode.

FIG. 20 shows a schematic diagram of the fifth hydraulic arrangement 500, in a raising mode. Each of the AIVs 132*a*, 132*b*, 132*c*, 132*d* are opened to allow hydraulic fluid to flow therethrough and into the lift actuators 26*a*. 26*b*, 26*c*, 26*d*. In the raising mode, the supply pump 112 generates pressure inducing fluid flow to lift against the load on the lift actuators 26*a*, 26*b*, 26*c*. 26*d*. Each of the SAIVs 502*a*, 502*b*, 502*c*, 502*d* may remain closed during the raising mode.

Figure 21:
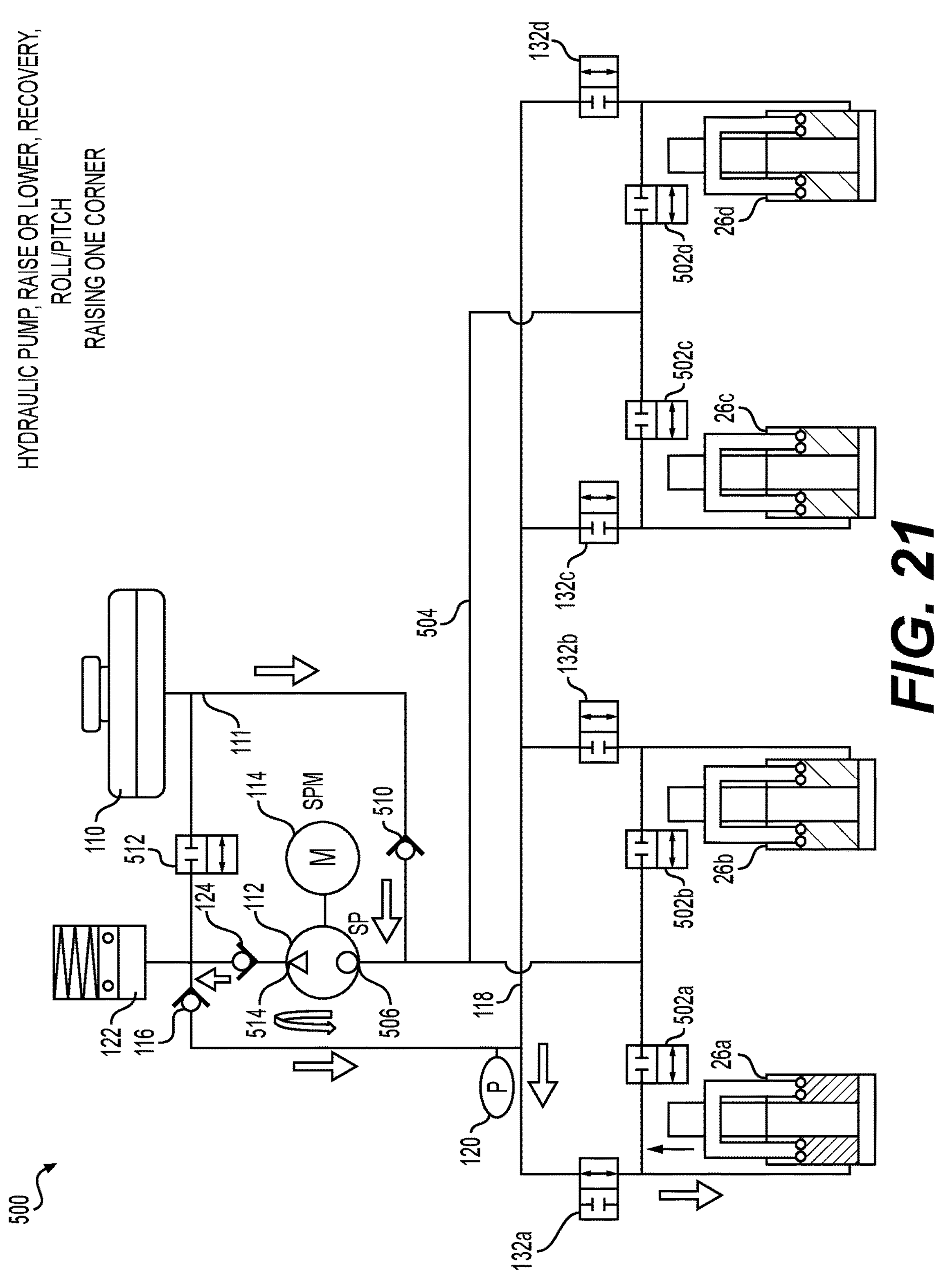
FIG. 21 shows a schematic diagram of the fifth hydraulic arrangement of FIG. 19, raising only one corner.

FIG. 21 shows a schematic diagram of the fifth hydraulic arrangement 500, raising only one corner, with the supply pump 112 running, and only one of the AIVs 132*a*, 132*b*, 132*c*, 132*d* is opened to allow hydraulic fluid to flow therethrough and into a corresponding one of the lift actuators 26*a*, 26*b*, 26*c*, 26*d*.

Figure 22:
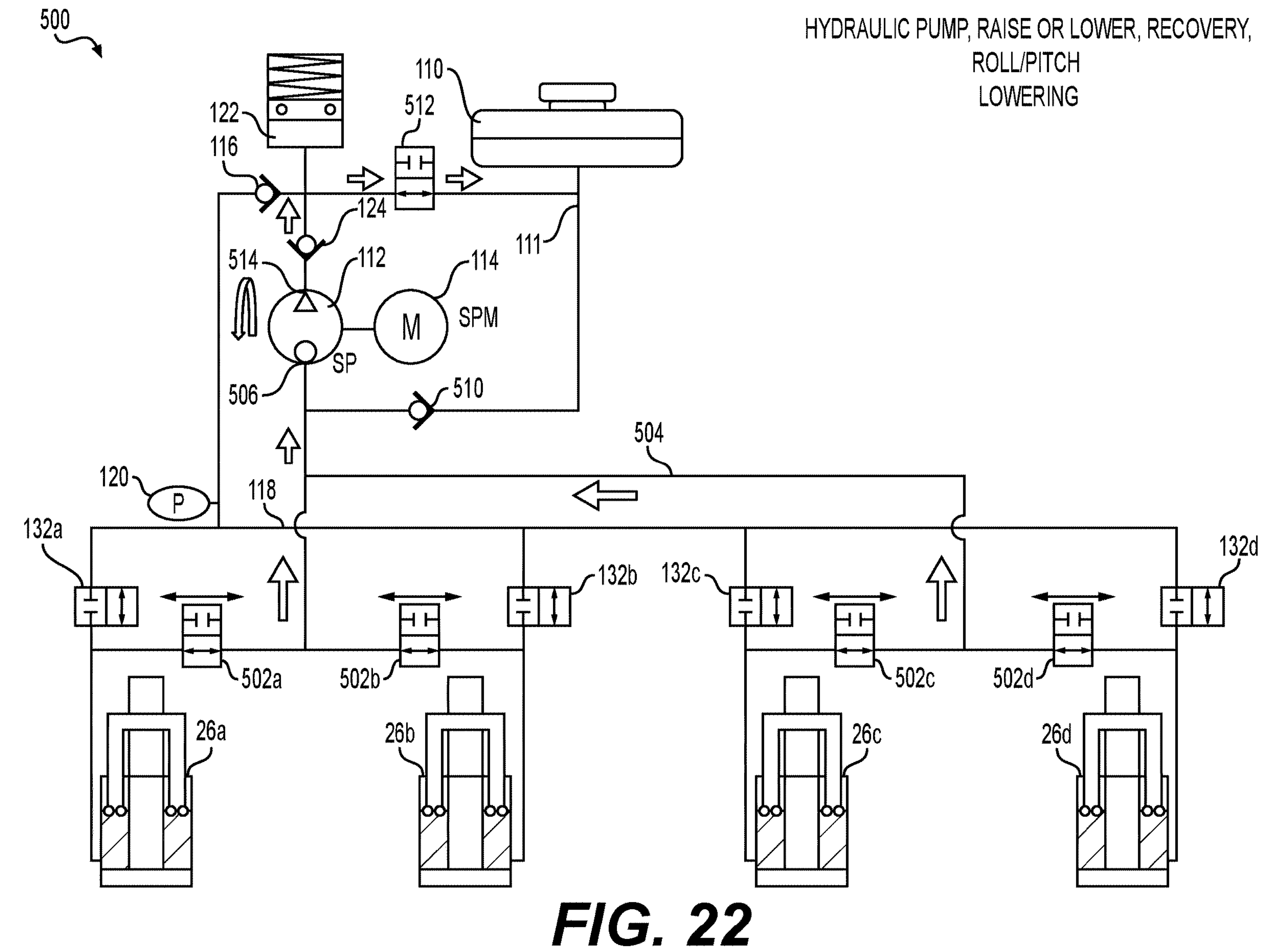
FIG. 22 shows a schematic diagram of the fifth hydraulic arrangement of FIG. 19, in a lowering mode.

FIG. 22 shows a schematic diagram of the fifth hydraulic arrangement 500, in a lowering mode, with each of the AIVs 132*a*. 132*b*, 132*c*, 132*d* closed and with the supply control valve 512 and each of the SAIVs 502*a*, 502*b*, 502*c*, 502*d* opened to direct fluid flow from the lift actuators 26*a*, 26*b*, 26*c*. 26*d* to the standard reservoir 110 through the supply pump 112 and further through the supply control valve 512. In this mode, the lowering pressure turns the supply pump 112, thereby driving the supply pump motor 114, which may act as a generator for recovering the hydraulic energy as electrical energy.

Figure 23:
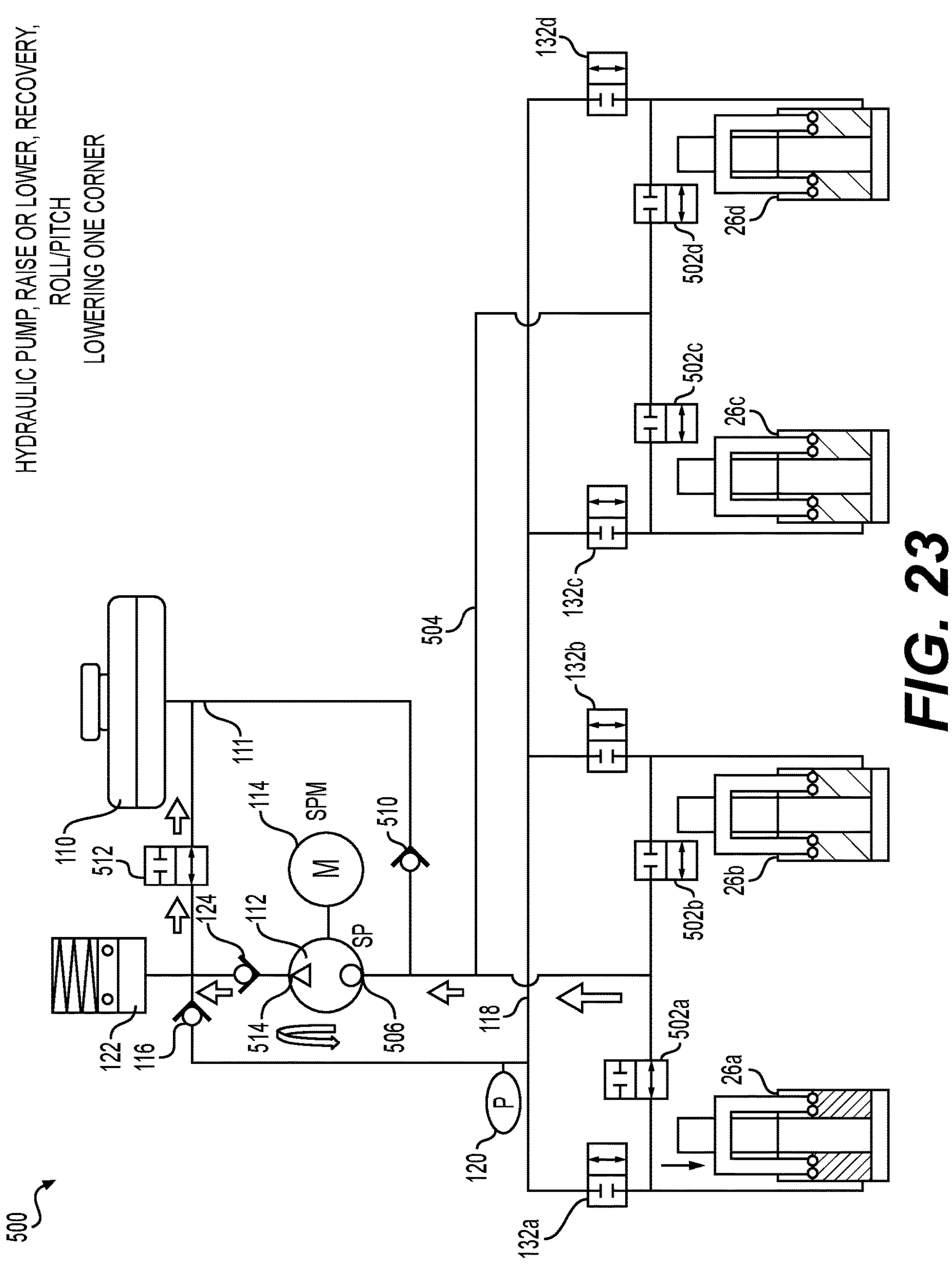
FIG. 23 shows a schematic diagram of the fifth hydraulic arrangement of FIG. 19, lowering only one corner.

FIG. 23 shows a schematic diagram of the fifth hydraulic arrangement 500, lowering only one corner. In this mode, a corresponding one of the SAIVs 502*a*, 502*b*, 502*c*, 502*d* may be opened to release hydraulic fluid from a corresponding one of the lift actuators 26*a*, 26*b*, 26*c*, 26*d*. The hydraulic fluid may flow therefrom back to the standard reservoir 110 similarly to the lowering mode of FIG. 22, and hydraulic energy may be similarly recovered as electrical energy. Different corners of the vehicle 20 may be lowered at different times for roll and/or pitch control by selectively commanding the SAIVs 502*a*, 502*b*, 502*c*, 502*d* to open.

Figure 24:
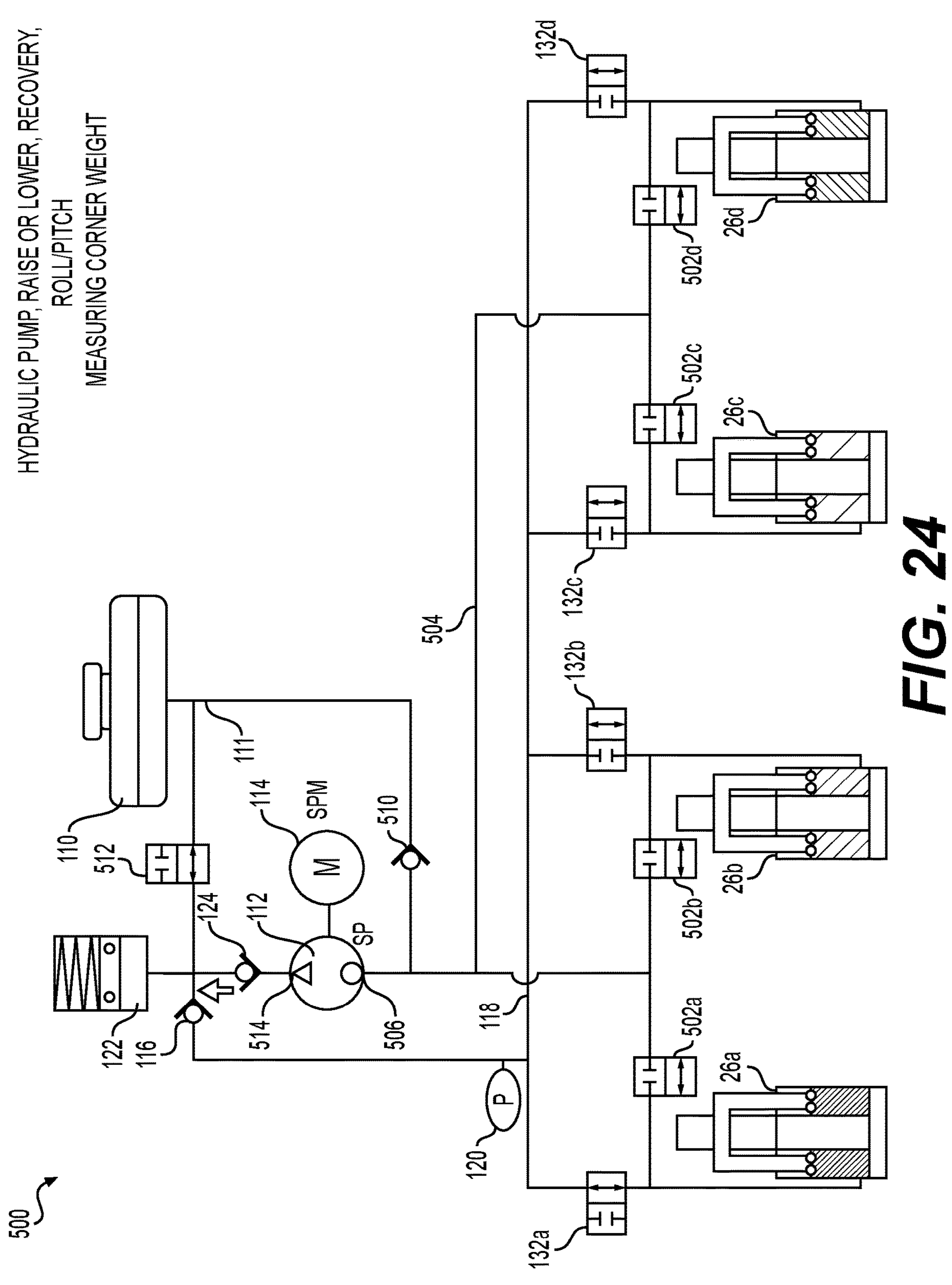
FIG. 24 shows a schematic diagram of the fifth hydraulic arrangement of FIG. 19, measuring weight on a first corner.

FIG. 24 shows a schematic diagram of the fifth hydraulic arrangement 500, measuring weight on a first corner. As shown in FIG. 24, the supply control valve 512 and each of the SAIVs 502*a*, 502*b*, 502*c*, 502*d* are maintained in a closed state, and one of the AIVs 132*a*, 132*b*, 132*c*, 132*d* is opened at a given time to provide fluid communication between a corresponding one of lift actuators 26*a*, 26*b*, 26*c*, 26*d* and the first manifold 118. The pressure sensor 120 may measure the fluid pressure in the first manifold 118 during a time when each of the AIVs 132*a*, 132*b*, 132*c*, 132*d* is opened to measure the fluid pressure corresponding to the weights in each of the corners of the vehicle 20. The weight measuring mode of fifth hydraulic arrangement 500 may otherwise be similar or identical to the weight measuring mode of the first hydraulic arrangement 100 described herein with reference to FIG. 10.

Figure 25:
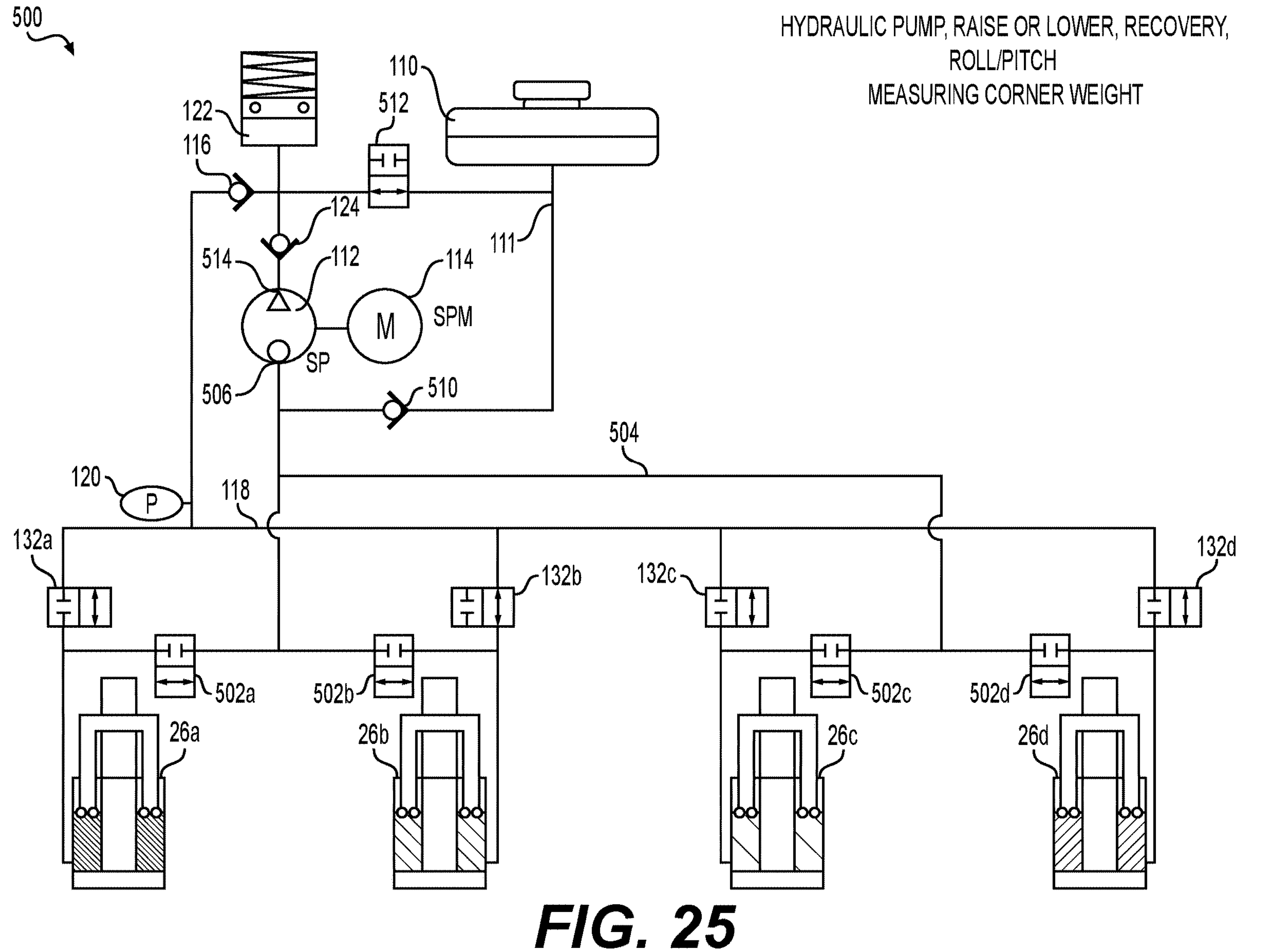
FIG. 25 shows a schematic diagram of the fifth hydraulic arrangement of FIG. 19, measuring weight on a second corner.

FIG. 25 shows a schematic diagram of the fifth hydraulic arrangement 500, measuring weight on a second corner, with the second AIV 132*b* opened with the other ones of the AIVs 132*a*, 132*b*, 132*c*, 132*d* closed for measuring fluid pressure in the right-front lift actuator 26*b* for determining weight on the right-front corner of the vehicle 20.

Figure 26:
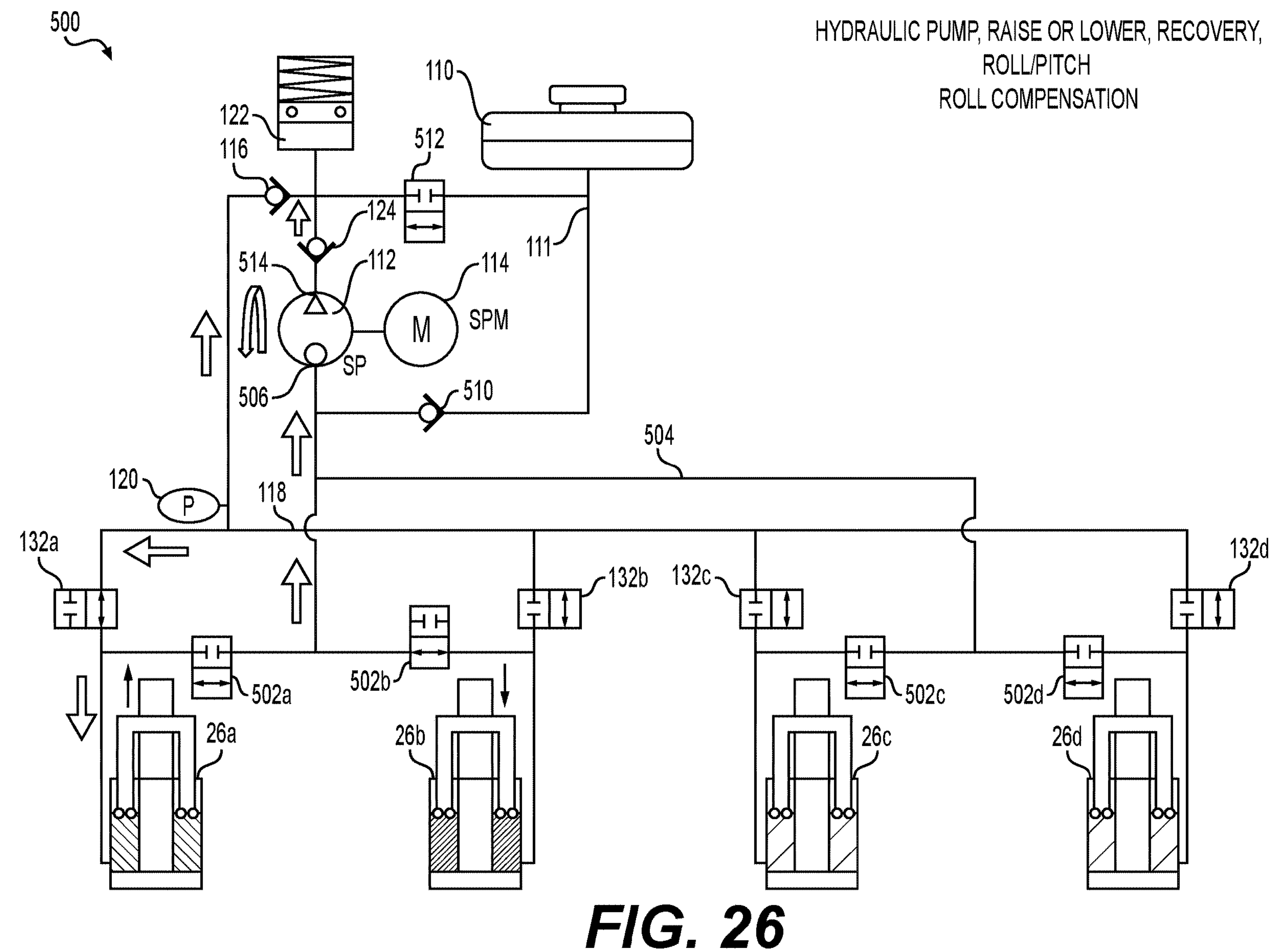
FIG. 26 shows a schematic diagram of the fifth hydraulic arrangement of FIG. 19, in a roll compensation mode.

FIG. 26 shows a schematic diagram of the fifth hydraulic arrangement 500, in a roll compensation mode, with a left-front AIV 132*a* associated with the left-front lift actuator 26*a* and a right-front SAIV 502*b* associated with the right-front lift actuator 26*a* each opened. The supply control valve 512 and all of the other ones of the AIVs 132*a*, 132*b*, 132*c*, 132*d* and all of the other ones of the SAIVs 502*a*, 502*b*, 502*c*, 502*d* are maintained in a closed state. The supply pump 112 is energized to pump fluid from the right-front lift actuator 26*b* and into the left-front lift actuator 26*a*, thereby lifting the left-front corner while lowering the right-front corner of the vehicle 20. This lifting and lowering may compensate for other roll forces on the vehicle 20, such as cornering force and/or from the vehicle 20 being operated on a surface with a left/right slope.

Figure 27:
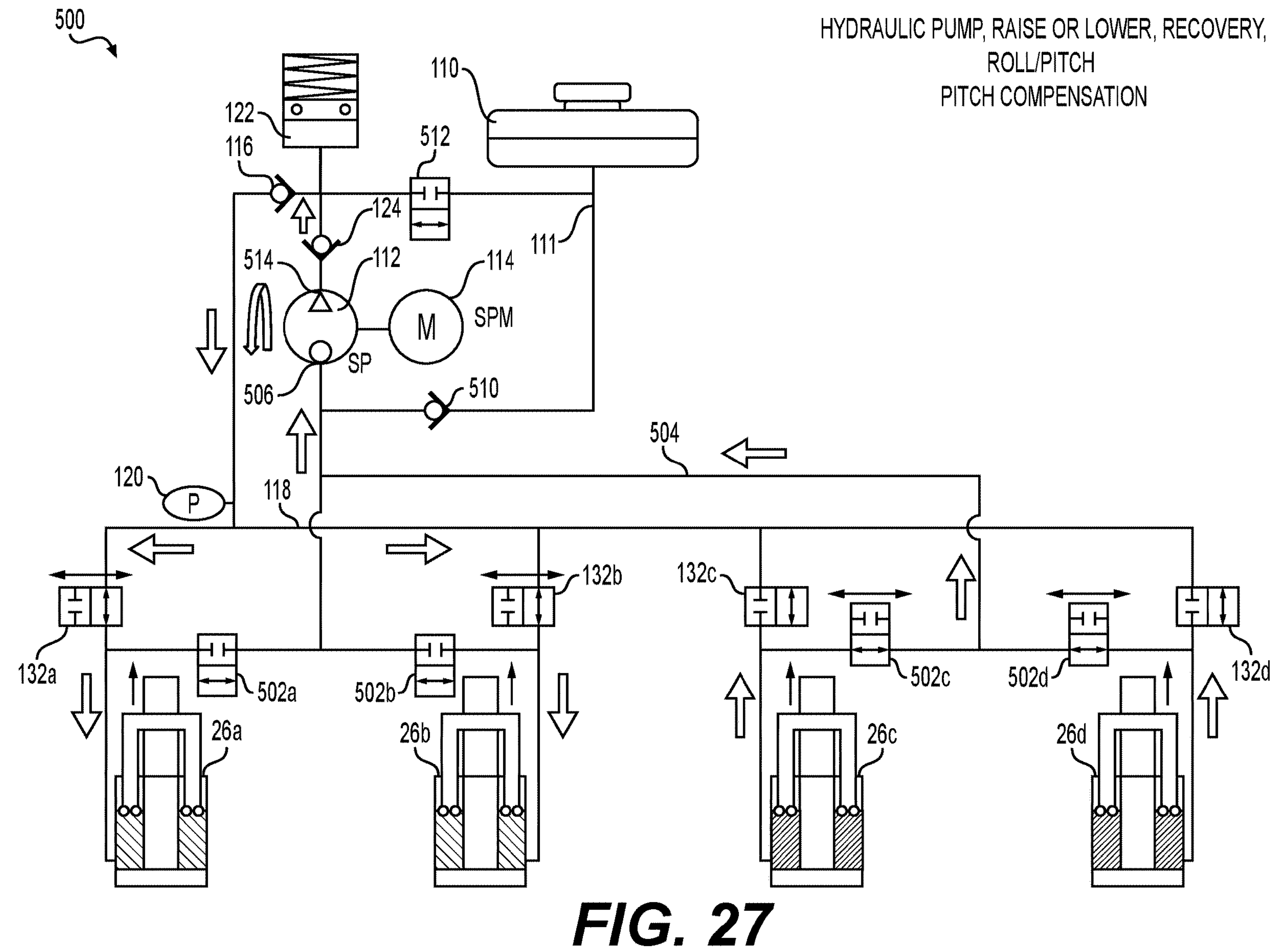
FIG. 27 shows a schematic diagram of the fifth hydraulic arrangement of FIG. 19, in a pitch compensation mode.

FIG. 27 shows a schematic diagram of the fifth hydraulic arrangement 500, in a pitch compensation mode, with the left-front AIV 132*a* and the right-front AIV 132*b* associated with the left-front lift actuator 26*a* and the right-front lift actuator 26*b*, respectively, each being opened. The left-rear SAIV 502*c* and the right-rear SAIV 502*d* associated with the left-rear lift actuator 26*c* and the right-rear lift actuator 26*d*, respectively, are also opened. The supply control valve 512 and all of the other ones of the AIVs 132*a*, 132*b*, 132*c*, 132*d* and all of the other ones of the SAIVs 502*a*, 502*b*, 502*c*, 502*d* are maintained in a closed state. The supply pump 112 is energized to pump fluid from the rear lift actuators 26*c*, 26*d* and into the front lift actuators 26*a*, 26*b* for lifting the front of the vehicle 20 while lowering the rear of the vehicle 20 and for controlling a pitch of the vehicle 20. The AIVs 132*a*, 132*b*, 132*c*, 132*d* and the SAIVs 502*a*, 502*b*, 502*c*, 502*d* may be operated in an opposite configuration for lifting the rear of the vehicle 20 while lowering the front of the vehicle 20 and for controlling pitch of the vehicle 20 in an opposite direction.

Figure 28:
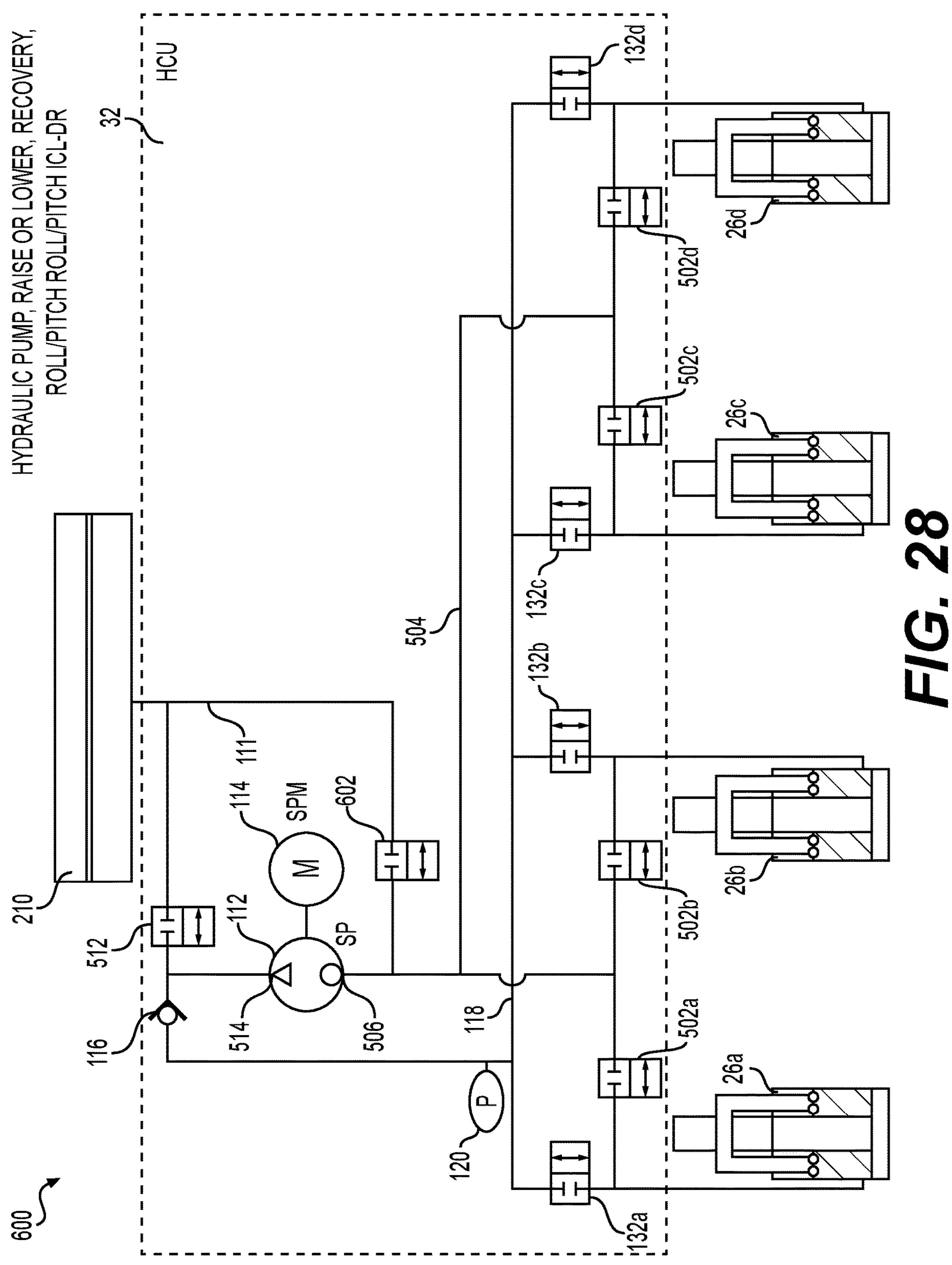
FIG. 28 shows a schematic diagram of a sixth hydraulic arrangement for the ICL system of the present disclosure.

FIG. 28 shows a schematic diagram of a sixth hydraulic arrangement 600 for the ICL system 10 of the present disclosure. The sixth hydraulic arrangement 600 may be similar or identical to the fifth hydraulic arrangement 500, except for a few additional features described herein. The sixth hydraulic arrangement 600 includes a Hydraulic Energy Storage Device (HESD) 210 in place of the standard reservoir 110. The sixth hydraulic arrangement 600 also includes a return control valve 602 in place of the return check valve 510. The return control valve 602 may include a solenoid valve, which may be a normally-closed valve. The return control valve 602 functions to selectively control fluid flow between the supply passage 111 and the return fluid passage 504.

Figure 29:
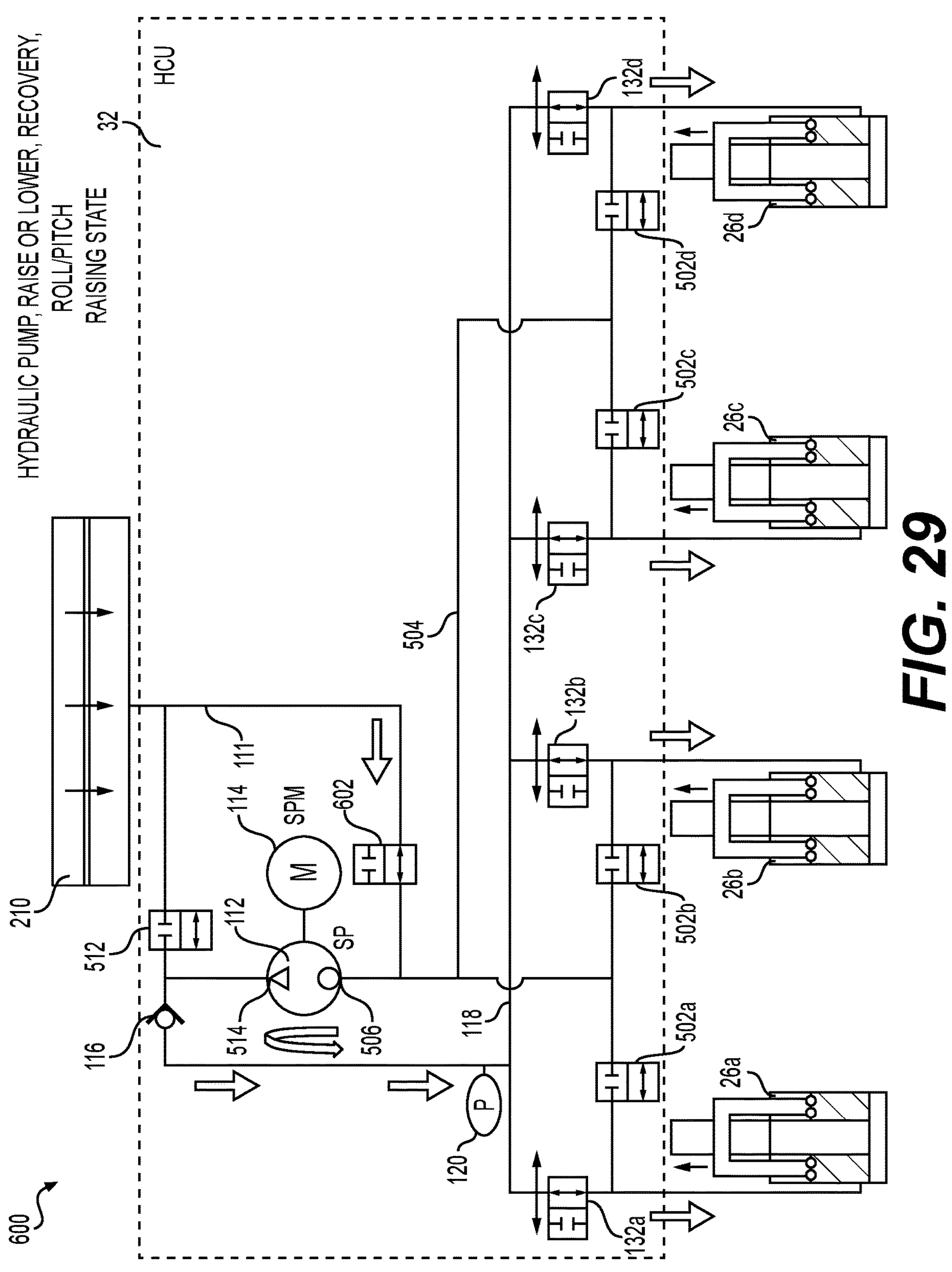
FIG. 29 shows a schematic diagram of the sixth hydraulic arrangement of FIG. 28, in a raising mode.

FIG. 29 shows a schematic diagram of the sixth hydraulic arrangement 600, in a raising mode, with the supply control valve 512 and all of the SAIVs 502*a*, 502*b*, 502*c*, 502*d* closed, and with the return control valve 602 and each of the AIVs 132*a*, 132*b*, 132*c*, 132*d* opened. Arrows indicate that the supply pump 112 is turning to pump hydraulic fluid from the HESD 210 through the return control valve 602 and into each of the lift actuators 26*a*, 26*b*, 26*c*, 26*d* via the first manifold 118.

Figure 30:
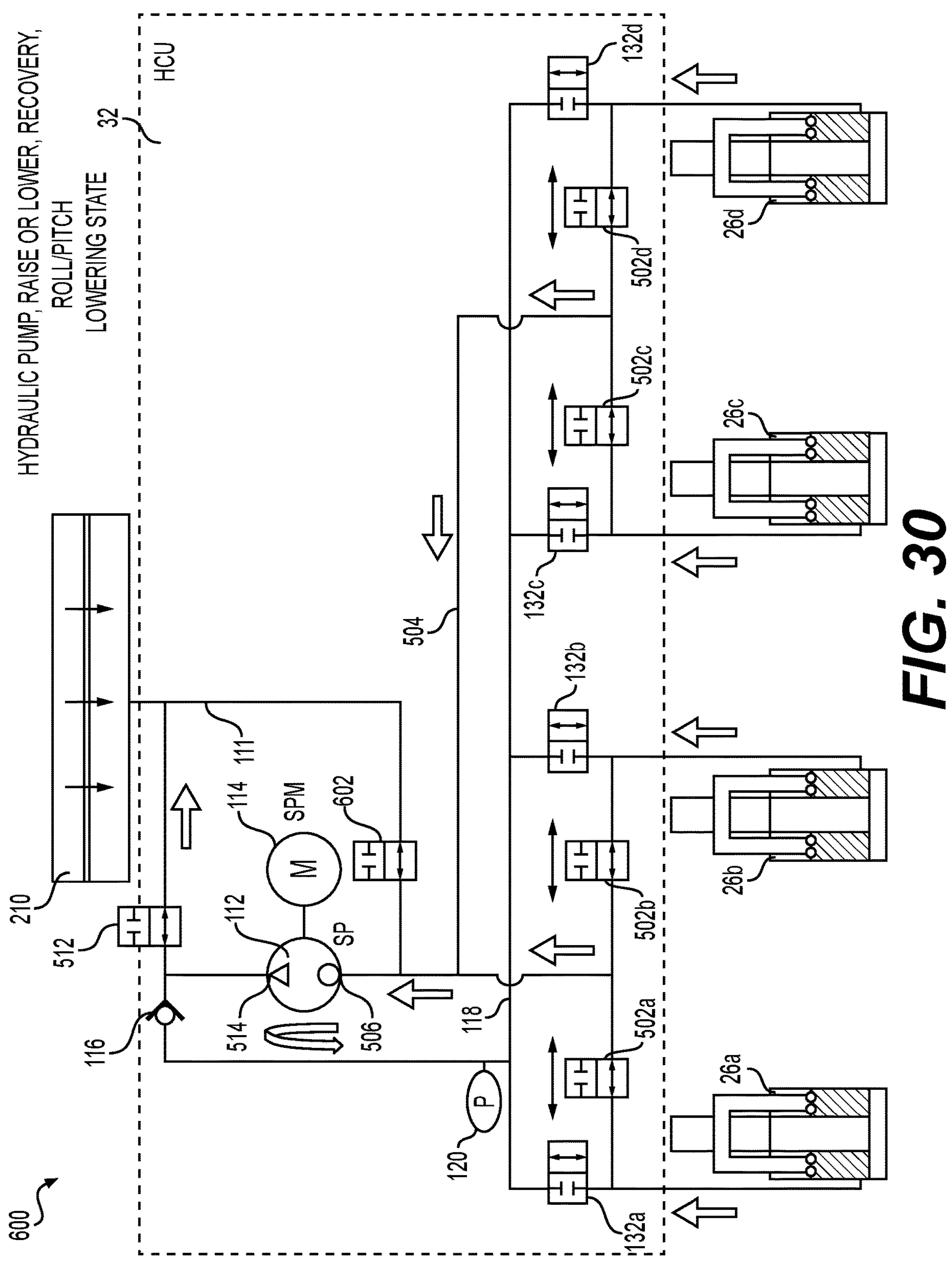
FIG. 30 shows a schematic diagram of the sixth hydraulic arrangement of FIG. 28, in a lowering mode.

FIG. 30 shows a schematic diagram of the sixth hydraulic arrangement 600, in a lowering mode, with the supply control valve 512 and all of the SAIVs 502*a*, 502*b*, 502*c*, 502*d* opened, and with the return control valve 602 and each of the AIVs 132*a*, 132*b*, 132*c*, 132*d* closed. Arrows indicate that the supply pump 112 is turning to pump hydraulic fluid from each of the lift actuators 26*a*, 26*b*, 26*c*, 26*d* through the supply control valve 512 and into the HESD 210.

Figure 31:
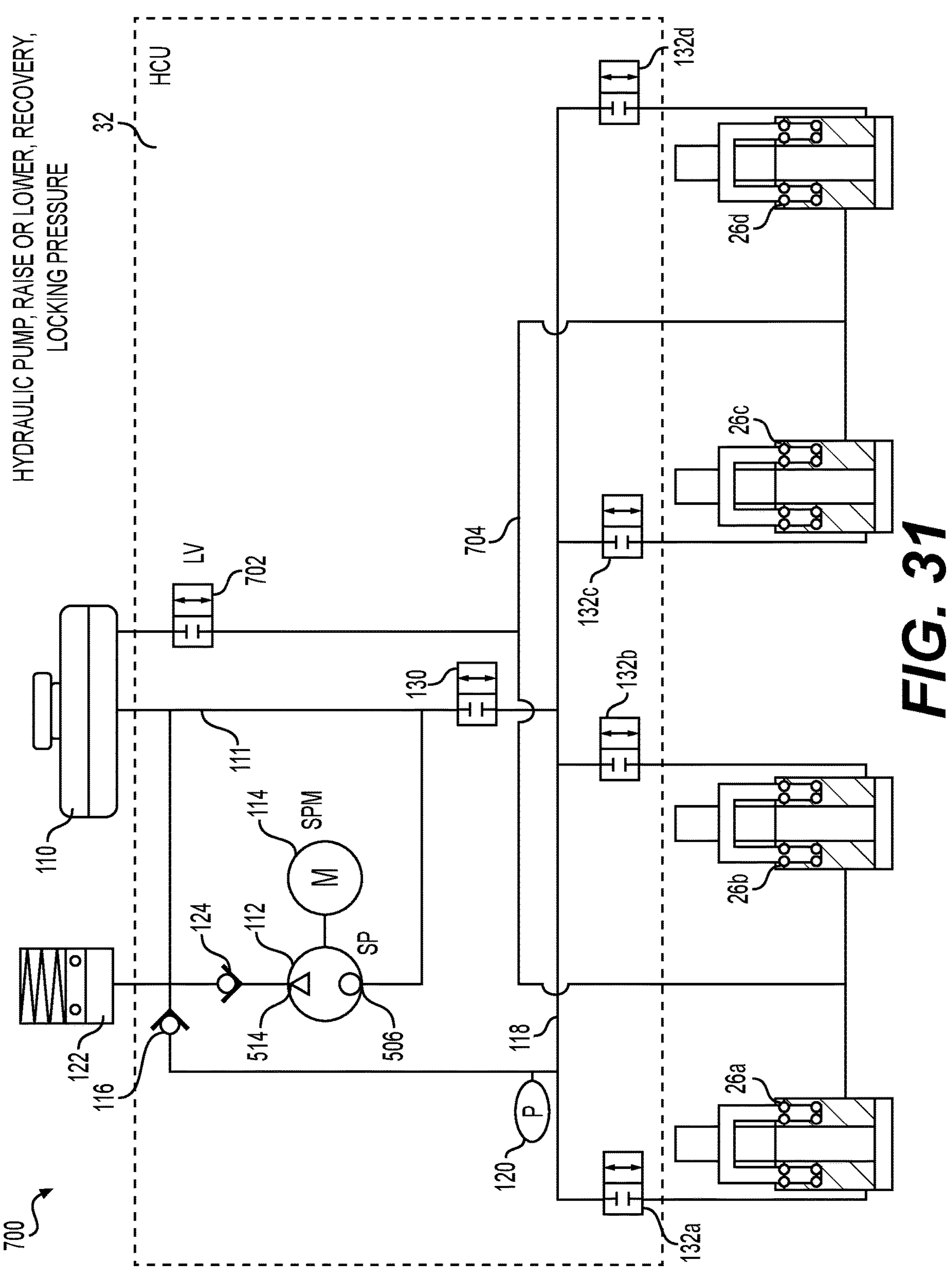
FIG. 31 shows a schematic diagram of a seventh hydraulic arrangement for the ICL system of the present disclosure and in a pressure locking mode.

FIG. 31 shows a schematic diagram of a seventh hydraulic arrangement 700 for the ICL system 10 of the present disclosure, and in a pressure locking mode. The seventh hydraulic arrangement 700 may be similar or identical to the first hydraulic arrangement 100, except for the addition of a locking valve (LV) 702 and a secondary leveling chamber 704 in fluid communication with each of the lift actuators 26*a*, 26*b*, 26*c*, 26*d*. The LHCU 32 may define, at least partially, the secondary leveling chamber 704. The LV 702 may include a solenoid valve, which may be a normally-closed valve. The LV 702 is configured to selectively conduct hydraulic fluid between the lift actuators 26*a*. 26*b*, 26*c*, 26*d* and the standard reservoir 110 via the secondary leveling chamber 704. The LV 702 functions to allow or isolate flow of hydraulic fluid between the standard reservoir 110 and the secondary leveling chamber 704.

The LV 702 may have a self-locking orientation from the actuator side (i.e. from the secondary leveling chamber 704). The LV 702 may be configured to withstand a maximum differential pressure (maximum DeltaP) in a downstream to upstream direction that corresponds to a 2 g jounce and 0 bar upstream. The LV 702 may be configured to withstand a maximum differential pressure (maximum DeltaP) in an upstream to downstream direction that corresponds to a 2 g jounce on one corner while raising only this corner and rebound on another corner with 20 bar suspension spring preload. The LV 702 may have a cracking pressure that is based on the maximum DeltaP.

Figure 32:
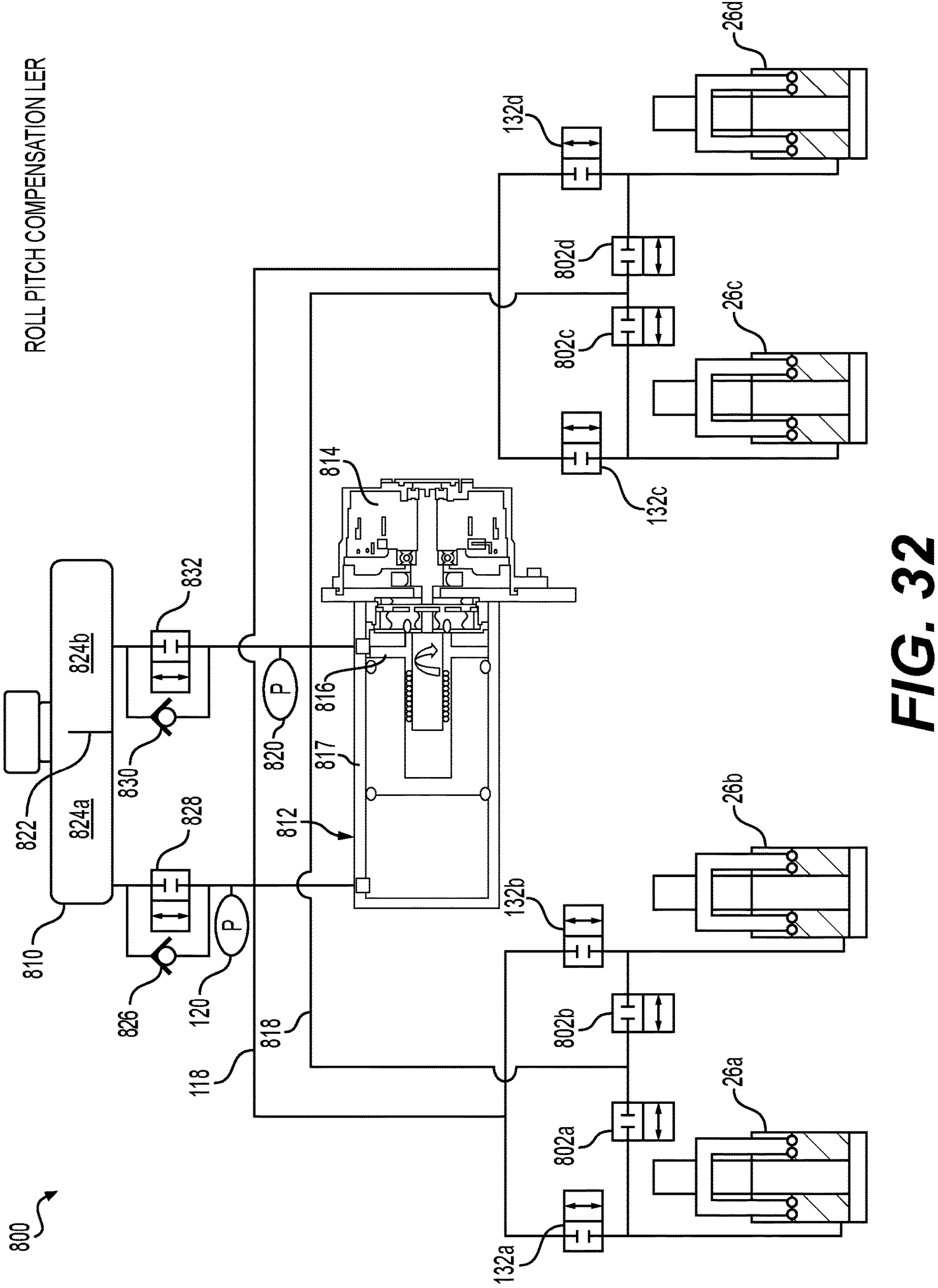
FIG. 32 shows a schematic diagram of an eighth hydraulic arrangement for the ICL system of the present disclosure.

FIG. 32 shows a schematic diagram of an eighth hydraulic arrangement 800 for the ICL system 10 of the present disclosure. The eighth hydraulic arrangement 800 may be similar or identical to the fifth hydraulic arrangement 500, except for a few differences described herein. The eighth hydraulic arrangement 800 includes a divided reservoir 810 in place of the standard reservoir 110. The eighth hydraulic arrangement 800 also includes a piston pump assembly 812 in place of the supply pump 112, and a piston actuator motor 814 in place of the supply pump motor 114. The piston pump assembly 812 may include a ball screw actuator and/or a reduction gearset to convert rotational torque produced by the piston actuator motor 814 into linear force for moving a pump piston 816 through a cylinder 817, and thereby pumping the hydraulic fluid. The piston pump assembly 812 supplies hydraulic fluid to each of the first manifold 118 and a second manifold 818, with each of the manifolds 118, 818 being coupled to a corresponding chamber in the piston pump assembly 812, with the chambers separated by the piston 816 that translates linearly through the cylinder 817 in response to actuation by the piston actuator motor 814.

The eighth hydraulic arrangement 800 also includes a pressure sensor 120 configured to measure a pressure of hydraulic fluid in the first manifold 118, and a second pressure sensor 820 configured to measure a pressure of hydraulic fluid in the second manifold 818. Each of the pressure sensors 120, 820 may communicate signals indicative of the measured pressure to the LECU 30.

The eighth hydraulic arrangement 800 includes a plurality of actuator isolation valves (AIV) 132*a*, 132*b*, 132*c*, 132*d*, with each of the AIVs 132*a*, 132*b*, 132*c*, 132*d* configured to selectively control fluid flow between the first manifold 118 and a corresponding one of the lift actuators 26*a*, 26*b*, 26*c*, 26*d*. The eighth hydraulic arrangement 800 includes a plurality of second actuator isolation valves 802*a*, 802*b*, 802*c*, 802*d*, with each of the second actuator isolation valves 802*a*, 802*b*, 802*c*, 802*d* configured to selectively control fluid flow between the second manifold 818 and a corresponding one of the lift actuators 26*a*, 26*b*, 26*c*, 26*d*.

The divided reservoir 810 includes a partition 822 to separate an internal space into a first container 824*a* and a second container 824*b*. The partition 822 may extend only part-way up so the containers 824*a*, 824*b* can be filled together, but which keeps fluid in the containers 824*a*. 824*b* separate when a fluid level in the divided reservoir 810 is below a given level, such as a top of the partition 822.

The eighth hydraulic arrangement 800 also includes a first circuit check valve 826 in parallel with a first circuit isolation valve 828, and each fluidly connected in a parallel arrangement between the first container 824*a* of the divided reservoir 810 and the first manifold 118. The first circuit check valve 826 is configured to allow fluid flow from the first container 824*a* of the divided reservoir 810 and into the first manifold, while blocking fluid flow in an opposite direction. The first circuit isolation valve 828 selectively allows fluid flow from the first manifold 118 to the first container 824*a* of the divided reservoir 810. The first circuit isolation valve 828 may include a solenoid valve, which may be a normally-closed valve. The SCV 116 and the SPIV 302 may function similarly to the SCV 116 and the SPIV 302, respectively, in the third hydraulic arrangement 300.

The eighth hydraulic arrangement 800 also includes a second circuit check valve 830 in parallel with a second circuit isolation valve 832, and each fluidly connected in a parallel arrangement between the second container 824*b* of the divided reservoir 810 and the second manifold 818. The second circuit check valve 830 and the second circuit isolation valve 832 may have similar or identical construction and function as the first circuit check valve 826 and the first circuit isolation valve 828, respectively.

Figure 33:
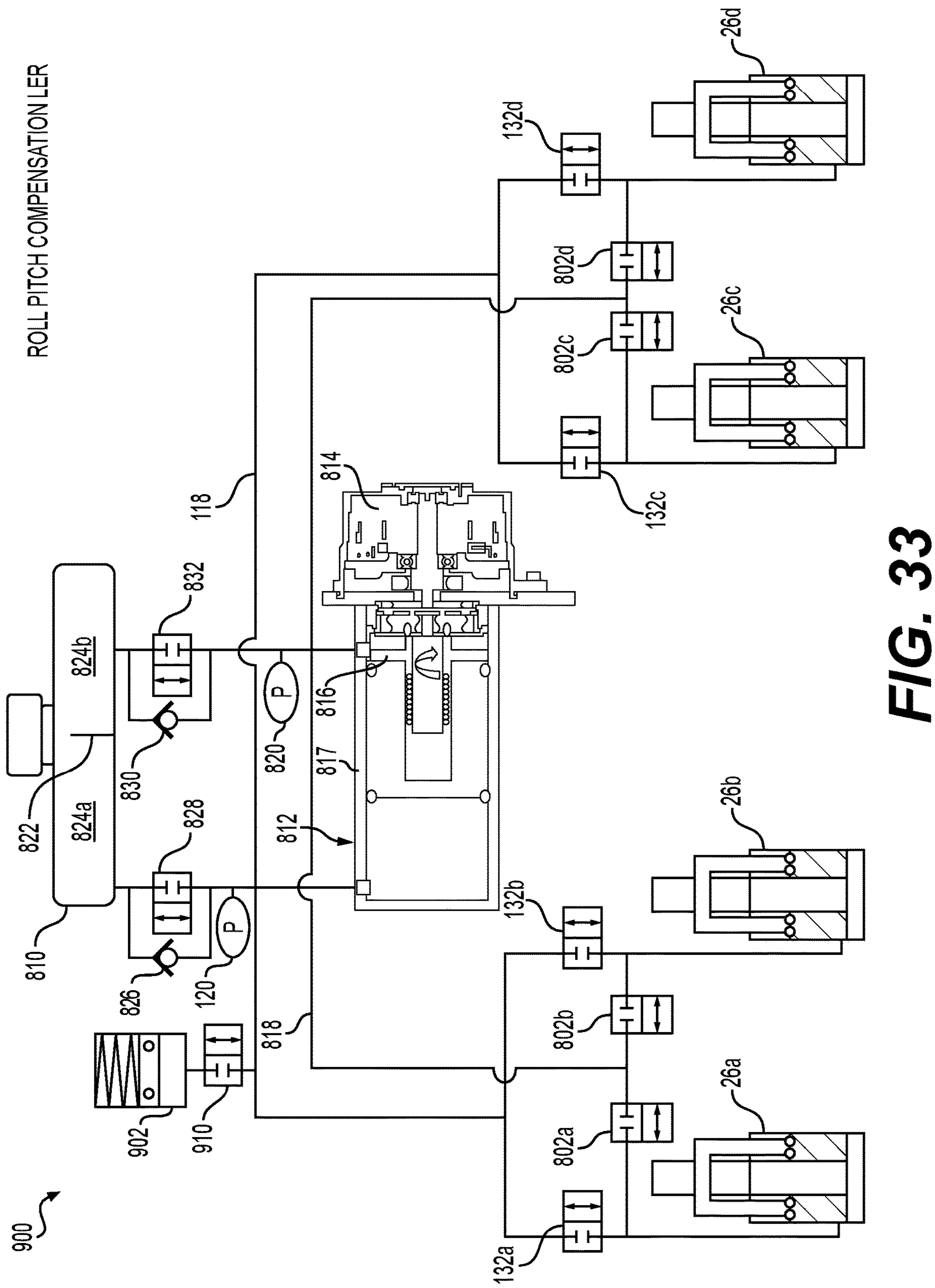
FIG. 33 shows a schematic diagram of a ninth hydraulic arrangement for the ICL system of the present disclosure.

FIG. 33 shows a schematic diagram of a ninth hydraulic arrangement 900 for the ICL system 10 of the present disclosure. The ninth hydraulic arrangement 900 may be similar or identical to the eighth hydraulic arrangement 800, except for the addition of a second hydraulic accumulator 902 and an accumulator isolation valve 910. The second hydraulic accumulator 902 includes a chamber in fluid communication with the first manifold 118 with an accumulator piston disposed therein. The accumulator piston is movable in the chamber of the second hydraulic accumulator 902 as a volume of fluid therein changes. A spring biases the accumulator piston of the second hydraulic accumulator 902 to push fluid out of the chamber of the second hydraulic accumulator 902. The second hydraulic accumulator 902 may function to maintain and stabilize pressure in the first manifold 118. The accumulator isolation valve 910 is configured to selectively allow fluid flow between the first manifold 118 and the second hydraulic accumulator 902. The accumulator isolation valve 910 may include a solenoid valve, which may be a normally-open valve.

Figure 34:
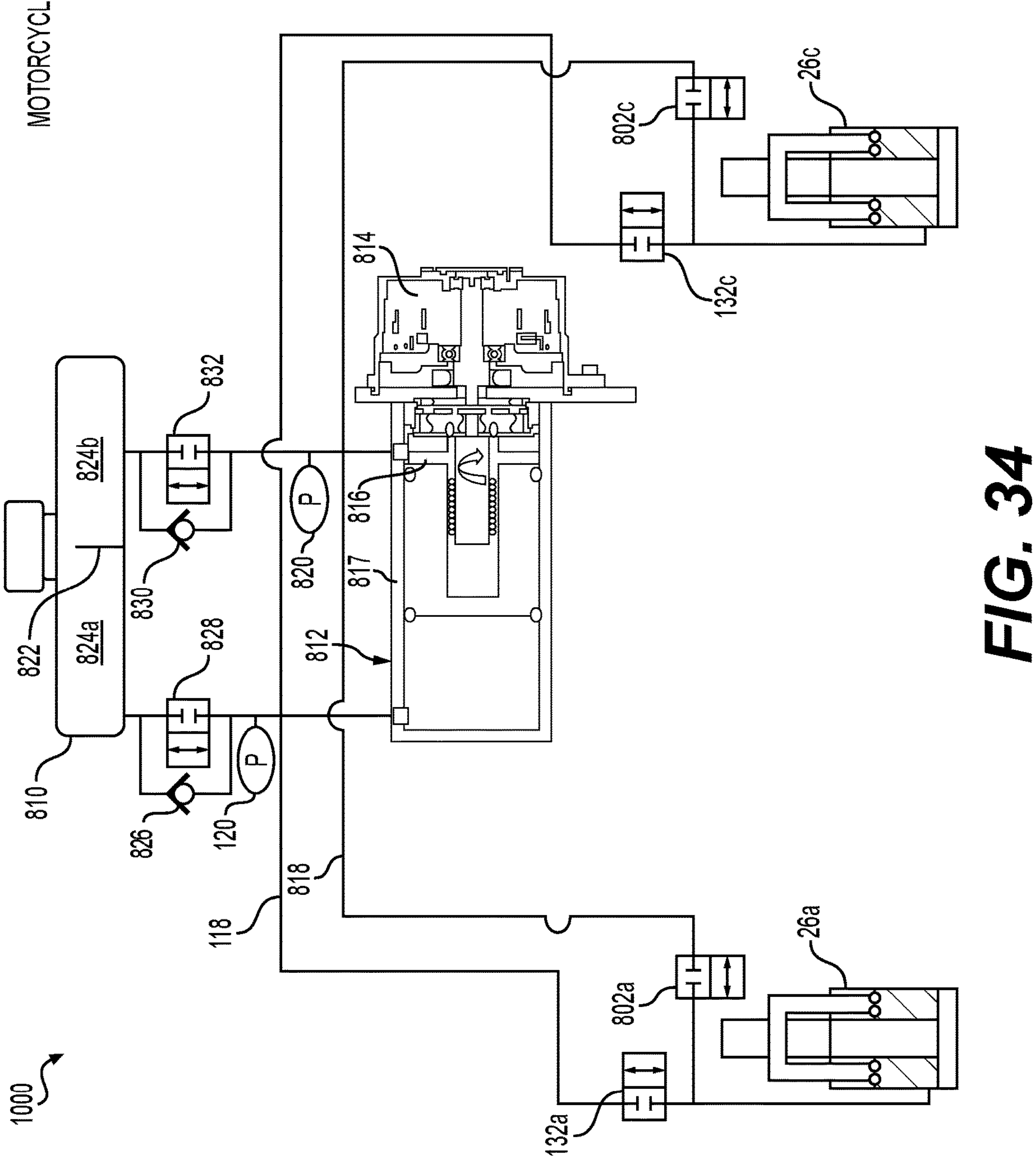
FIG. 34 shows a schematic diagram of a tenth hydraulic arrangement for an ICL system, in accordance with an aspect of the present disclosure.

FIG. 34 shows a schematic diagram of a tenth hydraulic arrangement 1000 for the ICL system 10 of the present disclosure. The tenth hydraulic arrangement 1000 may be similar or identical to the eighth hydraulic arrangement 800, except with only two of the lift actuators 26*a*, 26*b*, 26*c*, 26*d* (i.e. without the right-front lift actuator 26*b* and the right-rear lift actuator 26*d*, and without the control valves 802*b*, 832*b*, 802*d*, 832*d* associated with those lift actuators 26*b*, 26*d*. The tenth hydraulic arrangement 1000 may be used on a two-wheel vehicle, such as a motorcycle.

FIG. 35 shows a schematic diagram showing body-to-wheel measurement in an ICL system 10. FIG. 35 includes the left-front lift actuator 26*a* operably disposed between the left-front wheel 24*a* and a chassis element 80 of the vehicle 20. The chassis element 80 may include, for example, a body, a frame, or a subframe assembly. The principles illustrated on FIG. 35 may be applicable to either or both of a set of front wheels 24*a*, 24*b* or rear wheels 24*c*, 24*d* of the vehicle 20.

A coil spring 82 extends between the spring seat 70 of each of the lift actuators 26*a*, 26*b* and the chassis element 80 of the vehicle 20. A left-side height HL, which may be measured by a corresponding one of the height sensors 28, indicates a height of the chassis element 80 relative to the left-front wheel 24*a*. A right-side height HR, which may be measured by a corresponding one of the height sensors 28, indicates a height of the chassis element 80 relative to the right-front wheel 24*b*. An anti-roll bar 84, which may also be called a sway bar, connects the left-front wheel 24*a* and the right-front wheel 24*b*. As shown on FIG. 35, differences in positions of the left-front lift actuator 26*a* and the right-front actuator 26*b* may be compensated by different compression lengths of the corresponding coil springs 82, thereby maintaining the left-side height HL equal to or approximately equal to the right-side height HR.

The body-to-wheel measurement illustrated in FIG. 35 may be applied to any of the hydraulic arrangements of the present disclosure. A corner height of the vehicle 10 may be impacted by both spring height and actuator height. Actuator height (i.e. extension position of a corresponding one of the lift actuators 26*a*, 26*b*, 26*c*, 26*d*) may be determined based on spring height and corner height (which may be measured using a corresponding one of the height sensors 28) and spring height can be estimated based on corner weight, as described herein with reference to FIG. 35.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A height adjustment system for a vehicle, comprising:

a hydraulic energy storage device configured to hold hydraulic fluid;

at least one lift actuator operably disposed between a wheel and a chassis element of the vehicle for adjusting the height of the vehicle;

a supply pump having an inlet port in fluid communication with the hydraulic energy storage device and configured to transfer the hydraulic fluid to the at least one lift actuator via a manifold;

a supply check valve configured to allow fluid flow from an outlet of the supply pump to the manifold while blocking fluid flow in an opposite direction; and a supply pump isolation valve configured to selectively bypass hydraulic fluid around the supply check valve, be able to authorize reverse flow through the supply pump to allow the fluid to flow from the manifold through the supply pump to the hydraulic energy storage device, and provide increased flow from the supply pump to the manifold, and wherein the height adjustment system further includes a motor coupled to the supply pump, wherein the height adjustment system is operable in a lowering mode to transmit the hydraulic fluid from the at least one lift actuator through the supply pump isolation valve and through the supply pump in a reverse direction and to the hydraulic energy storage device, wherein the hydraulic energy storage device further includes a compressible fluid to store hydraulic energy based on the inlet flow of the hydraulic fluid, and wherein the motor is operable as a generator to recover hydraulic energy as electrical energy during the lowering mode and with the supply pump being driven by the flow of the hydraulic fluid therethrough, wherein the hydraulic energy storage device pre-loads the supply pump when the height adjustment system is operable in a raising mode.

2. The height adjustment system of claim 1, further including an actuator isolation valve configured to selectively control fluid flow between the manifold and the at least one lift actuator.

3. The height adjustment system of claim 1, wherein the supply pump includes a vane pump.

4. The height adjustment system of claim 1, wherein the at least one lift actuator includes a plurality of lift actuators, with each lift actuator of the plurality of lift actuators operably disposed between a corresponding wheel and a corresponding chassis element of the vehicle for adjusting the height of the vehicle.

5. The height adjustment system of claim 4, further including:

a leveling chamber providing fluid communication between each lift actuator of the plurality of lift actuators; and a locking valve configured to selectively conduct the hydraulic fluid between the plurality of lift actuators and the hydraulic energy storage device via the leveling chamber.

6. The height adjustment system of claim 1, wherein the hydraulic energy storage device includes the compressible fluid in a sealed compartment.

7. A hydraulic control unit for a height adjustment system of a vehicle, comprising:

a supply passage configured to attach to a hydraulic energy storage device, for transmitting a hydraulic fluid;

a manifold;

a supply pump having an inlet port in fluid communication with the hydraulic energy storage device via the supply passage and configured to transfer the hydraulic fluid to at least one lift actuator via the manifold;

a supply check valve configured to allow fluid flow from an outlet of the supply pump to the manifold while blocking fluid flow in an opposite direction; and a supply pump isolation valve configured to selectively bypass hydraulic fluid around the supply check valve, be able to authorize reverse flow through the supply pump to allow the fluid to flow from the manifold through the supply pump to the hydraulic energy storage device, and provide increased flow from the supply pump to the manifold, and wherein the hydraulic control unit further includes a motor coupled to the supply pump, wherein the hydraulic control unit is operable in a lowering mode to transmit the hydraulic fluid from the at least one lift actuator through the supply pump isolation valve and through the supply pump in a reverse direction and to the hydraulic energy storage device, wherein the hydraulic energy storage device further includes a compressible fluid to store hydraulic energy based on the inlet flow of the hydraulic fluid, and wherein the motor is operable as a generator to recover hydraulic energy as electrical energy during the lowering mode and with the supply pump being driven by the flow of the hydraulic fluid therethrough, wherein the hydraulic energy storage device pre-loads the supply pump when the hydraulic control unit is operable in a raising mode.

8. The hydraulic control unit of claim 7, further including an actuator isolation valve configured to selectively control fluid flow between the manifold and the at least one lift actuator.

* * * * *